US012330791B2

(12) United States Patent
Hoang et al.

(10) Patent No.: US 12,330,791 B2
(45) Date of Patent: Jun. 17, 2025

(54) DOOR ASSEMBLY SLIDE UNIT DISENGAGEMENT SYSTEM

(71) Applicant: Adient Aerospace, LLC, Bothell, WA (US)

(72) Inventors: Matthew Hoang, Westminster City, CA (US); Kyle Bettenhausen, Laguna Hills, CA (US)

(73) Assignee: Adient Aerospace, LLC, Bothell, WA (US)

( * ) Notice: Subject to any disclaimer, the term of this patent is extended or adjusted under 35 U.S.C. 154(b) by 400 days.

(21) Appl. No.: 17/693,289

(22) Filed: Mar. 11, 2022

(65) Prior Publication Data

US 2023/0287720 A1    Sep. 14, 2023

(51) Int. Cl.
*B64D 11/06*    (2006.01)
*B64C 1/14*    (2006.01)
(Continued)

(52) U.S. Cl.
CPC ........ *B64D 11/0606* (2014.12); *B64C 1/1438* (2013.01); *E05D 15/0652* (2013.01);
(Continued)

(58) Field of Classification Search
CPC ........ E05D 15/0652; E05D 2015/1026; E05D 15/063; E05Y 2201/684; E05Y 2900/132;
(Continued)

(56) References Cited

U.S. PATENT DOCUMENTS 3,829,929 A    8/1974  Foltz et al.
6,209,171 B1    4/2001  Pelletier et al.
(Continued)

FOREIGN PATENT DOCUMENTS

JP    2006002348 A    1/2006
WO    2014147452 A1    9/2014
(Continued)

OTHER PUBLICATIONS

Foreign document (Year: 2021).*
(Continued)

*Primary Examiner* — Hiwot E Tefera
(74) *Attorney, Agent, or Firm* — Yee & Associates, P.C.

(57) ABSTRACT

Examples provide a door assembly including a sliding door carrier unit having a disengagement mechanism for utilization within a vehicle cabin. The door assembly includes a sliding door movably mounted to a door support member of a seat unit. The door slides laterally between a fully retracted position and a deployed or partially deployed position. A decoupling latch is engaged to detach the sliding door from one or more slide units on the door support member. An auxiliary slide device includes at least one guide and guide profile to support the door and enable the door to return to the retracted position after the door is decoupled from the slide unit in a backup operational mode. The decoupling mechanism enables a user to return the sliding door to a fully retracted position after a failure of the slide units to operate in a normal operational mode.

20 Claims, 14 Drawing Sheets

(51) Int. Cl.
*E05D 15/06* (2006.01)
*E05D 15/10* (2006.01)

(52) U.S. Cl.
CPC . *E05D 2015/1026* (2013.01); *E05Y 2201/684* (2013.01); *E05Y 2900/132* (2013.01); *E05Y 2900/502* (2013.01)

(58) Field of Classification Search
CPC ......... E05Y 2900/502; E05Y 2800/252; E05Y 2201/64; E05Y 2201/214; E05C 19/02; E05C 19/04; B64D 11/0023; B64D 11/0606; E05B 65/08
See application file for complete search history.

(56) References Cited

U.S. PATENT DOCUMENTS

| | | | |
|---|---|---|---|
| 7,117,559 | B1 | 10/2006 | Barber |
| 11,667,369 | B2 * | 6/2023 | Gallagher, Jr. ............ E06B 7/32 244/118.5 |
| 2006/0145007 | A1 | 7/2006 | Melberg et al. |
| 2013/0020369 | A1 | 1/2013 | Ple |
| 2016/0298370 | A1 | 10/2016 | Druckman et al. |
| 2017/0106980 | A1 * | 4/2017 | Kuyper .............. B64D 11/0604 |
| 2017/0283064 | A1 | 10/2017 | Robinson |
| 2019/0210733 | A1 * | 7/2019 | Herault .............. B64D 11/0604 |
| 2019/0329891 | A1 * | 10/2019 | Bonnefoy .............. B60N 2/005 |
| 2020/0109586 | A1 * | 4/2020 | Inbal ....................... E05D 15/58 |
| 2020/0122838 | A1 * | 4/2020 | Bonnefoy .......... B64D 11/0606 |
| 2021/0180375 | A1 * | 6/2021 | Sak ....................... E05B 53/003 |
| 2022/0135230 | A1 * | 5/2022 | Satterfield .......... B64D 11/0606 108/44 |
| 2022/0402612 | A1 * | 12/2022 | Davis ................. B64D 11/0023 |

FOREIGN PATENT DOCUMENTS

| | | | |
|---|---|---|---|
| WO | 2014155353 | A1 | 10/2014 |
| WO | WO-2021084249 | A1 * | 5/2021 ......... B64D 11/0023 |

OTHER PUBLICATIONS

US Government, Federal Aviation Administration, "FAA Regulation 14 CFR 25.813—Emergency Exit Access" Jan. 1, 2011, cited Jan. 19, 2022; available at https://www.govinfo.gov/app/details/CFR-2011-title14-vol1/CFR-2011-title14-vol1-sec25-813, 1 page.

Ginger Travel Guru, "Qatar Q Suite Web Page", cited Jan. 19, 2022; available from: https://gingertravelguru.com/2017/09/30/qatar-q-suites/, 1 page.

Gulfstream, "YouTube video Gulfstream Sliding Door Abnormal Procedure" Aug. 29, 2014, cited Jan. 19, 2022; available from: https://www.youtube.com/watch?v=0312yuwyfQ4, 1:29 minute video clip.

Airbus letter to U.S. Department of Transportation, dated Mar. 18, 2013, in particular paragraph 13, 6 pages.

Grant of Exemption letter from Jeffrey E. Duven, Acting Manager, Transport Airplane Directorate, Aircraft Certification Service, dated Sep. 11, 2013, 12 pages.

U.S. Appl. No. 62/481,224, filed Apr. 4, 2017, 12 pages.

* cited by examiner

DOOR ASSEMBLY SLIDE UNIT DISENGAGEMENT SYSTEM

BACKGROUND

Door assemblies for seats within a vehicle, such as passenger seats in the cabins of passenger transportation vehicles, are sometimes provided to improve privacy for passengers. For example, a privacy screen, a movable partition, curtain, or door may be provided to divide one passenger seat from other passenger seats and/or from traffic in an adjacent aisle of the vehicle cabin. These types of privacy screens can be in a fixed position or capable of sliding from an open position to a closed position to provide passenger privacy from the aisle when the privacy screen is closed. However, if the door should become jammed or damaged, it may be difficult or impossible to return the door from the closed position back to the open position. This may result in an obstruction in aisles or block passenger access to other areas of the cabin.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations. Nor is it intended to identify key features or essential features of the claimed subject matter, nor is it intended to be used as an aid in determining the scope of the claimed subject matter.

Some aspects and implementations disclosed herein are directed to a door assembly including a sliding door carrier unit having a disengagement mechanism for utilization within a vehicle cabin. The seat unit includes a door support member and a sliding door movably mounted to the door support member which is movable between a fully retracted position and at least one deployed position. A door adjustment device is disposed between the door support member and the sliding door to movably support the sliding door on the door support member. The door adjustment device includes a carrier unit mounted to the sliding door and a slide unit releasably coupled to the carrier unit in a normal operation mode. A locking device couples the slide unit to the carrier unit in the normal operation mode. The locking device releases the slide unit from the carrier unit upon actuation of the locking device in a backup operation mode in which the carrier unit is fully detached from the slide unit in response to actuation of a decoupling latch.

Other examples provide a method for disengaging a sliding door carrier unit of a seat unit associated with a vehicle cabin. A decoupling latch associated with a sliding door movably mounted to a door support member of the seat unit is actuated in a normal operation mode to disengage a locking device and detach a carrier unit of the sliding door from a slide unit of the door support member. The sliding door is movable along the set of rails between a fully retracted position and at least one deployed position in the normal operation mode. The latch can be actuated if a user is unable to move the sliding door along a set of rails in the normal operation mode. If the sliding door is at least partially deployed, the sliding door is moved back toward the door support member while in a backup operation mode in which the carrier unit is fully detached from the slide unit in response to actuation of the decoupling latch. A set of guides associated with the sliding door fit within a set of guide channels associated with the door support member to secure the sliding door in an upright configuration while in the backup operation mode. The sliding door is secured in the fully retracted position in the backup operation mode to enable user access from the seat unit to an aisle of the vehicle cabin.

Still other examples provide system for a seat unit sliding door carrier unit having a disengagement mechanism for utilization within a vehicle cabin. The system includes a sliding door movably mounted to a door support member of the seat unit, the sliding door is movable between a fully retracted position and at least one deployed position. The sliding door includes a carrier unit releasably coupled to a slide unit mounted on the door support member. A locking device detachably couples to the carrier unit to the slide unit in a normal operation mode. The locking device is configured to release the slide unit from the carrier unit upon actuation of the locking device in a backup operation mode. A set of guides associated with the sliding door sit within a set of guide channels associated with the door support member to secure the sliding door in an upright configuration while the sliding door moves from the deployed position back into the fully retracted position in the backup operation mode.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
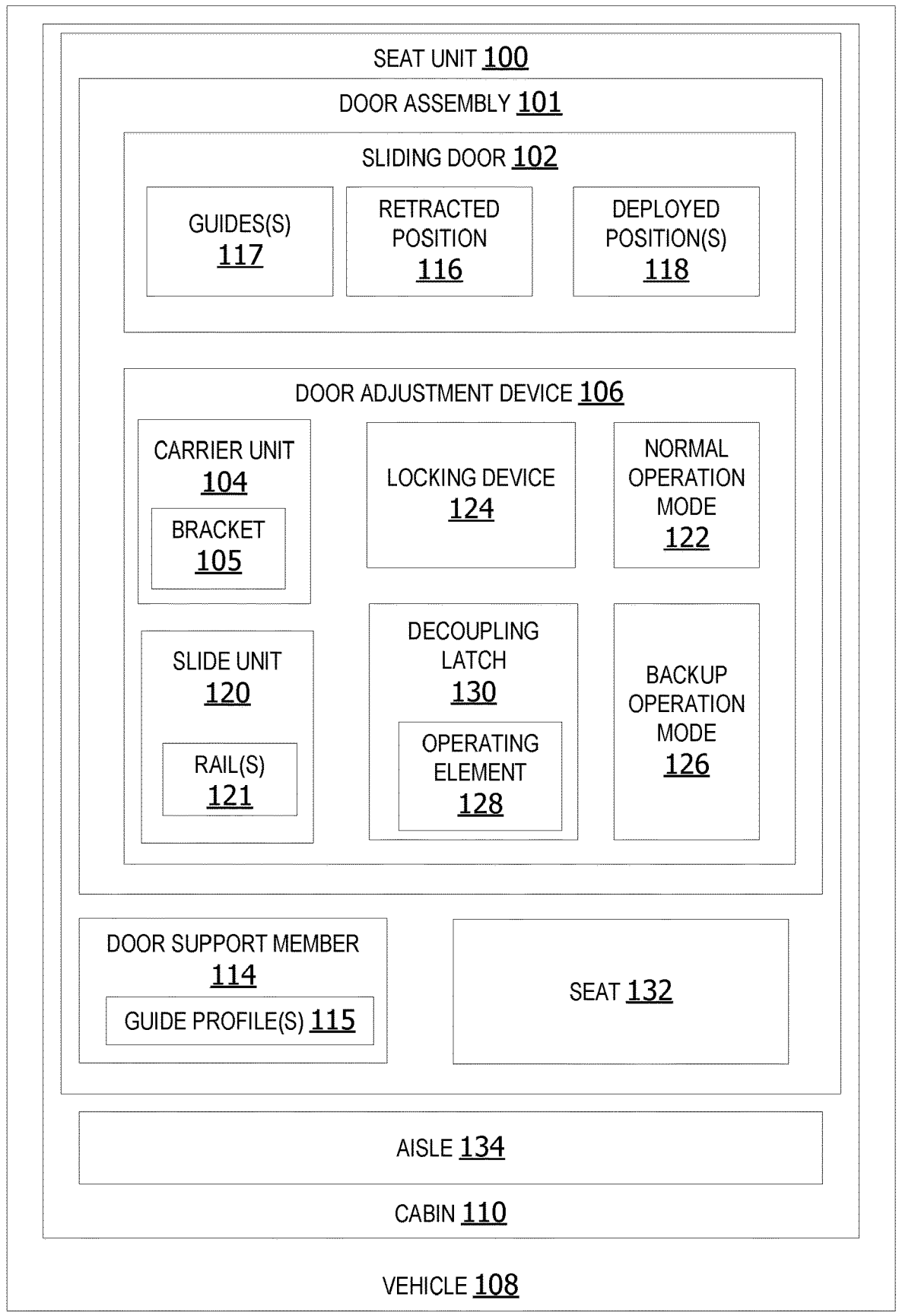
FIG. 1 is an exemplary block diagram illustrating a door assembly including a sliding door carrier unit having a door adjustment device providing a disengagement mechanism for utilization within a vehicle cabin.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

A door assembly associated with a seat unit for utilization within a vehicle cabin that includes a privacy door or other type of slidable screen or partition in vehicles, such as aircraft can become inoperable due to damage, improper use, a maintenance issue, a jammed rail, or other issue. If the door becomes inoperable in the extended position, a user may be unable to move the door back into a retracted position. An immovable door in such cases can block passenger access paths, obstruct movement of passengers and crew, and otherwise impede egress from the vehicle. It may be possible to manually remove the jammed door or step over it if the privacy door is not too tall, but these solutions are cumbersome, inconvenient, and potentially creates obstacles for users. Moreover, if the door is manually disassembled or forcibly moved, it may further damage the seat unit and/or result in the door falling into an aisle or other space between seats impeding the passenger's ability to move freely within a vehicle cabin.

Thus, aspects of the disclosure provide an improved door assembly for a seat unit provided within a vehicle cabin, such as an aircraft cabin. In case of an emergency, a malfunction case or a jammed (immobilized) door in an extended or partially extended position, the door can easily be opened or closed by actuating a lever to detach the sliding door from a slide unit enabling the jammed door to be moved from the deployed (extended) position to a fully retracted position in which passenger access areas are unobstructed safely without repairs, applying force or using any tools.

Referring to the figures, examples of the disclosure provide a door adjustment device enabling a sliding door to be disengaged from a slide unit on a door support member of a seat unit. If the primary door adjustment device becomes jammed, a decoupling latch is utilized to separate the sliding door carrier unit from the jammed or otherwise non-operational slide unit. The door is then moved from the fully deployed position or partially deployed position back into the retracted position via the auxiliary slide device using a set of guides and guide profiles to support the door as it is moved back to the retracted position. This enables a quick and efficient disengagement mechanism for decoupling a sliding door from a non-operational set of rails or other sliding mechanism while permitting the user to move the door into a desired open position for user access to a cabin aisle or other area outside the seat unit.

In other example, a locking device is provided that detachably couples the carrier unit to the slide unit in a normal operation mode. The locking device is configured to release the slide unit from the carrier unit upon actuation of the locking device in a backup operation mode. This provides an alternative method for moving a sliding door into a retracted position when the primary slide unit is nonoperational for improved user convenience and safety.

Other aspects provide a set of guides on the sliding door that engage channels on the door support member. When the sliding door is detached from the slide unit, an auxiliary slide device including at least one guide and at least one guide profile supports the weight of the sliding door and maintains the door in an upright configuration relative to the aisle and passenger seating area. This improves user safety and ensures smooth operation of the sliding door in the backup operation mode.

Referring more particularly to the drawings, FIG. 1 provides an exemplary block diagram illustrating a passenger seat unit 100 for a passenger. In some examples, the seat unit 100 includes a door assembly 101, a door support member 114 and a passenger seat 132. The door assembly 101 includes a sliding door 102, a carrier unit 104, a door adjustment device 106 and a slide unit 120. The door adjustment device 106 provides a disengagement mechanism for disengaging the carrier unit 104 of the sliding door 102 from the slide unit 120 attached to the door support member 114.

In some examples, the sliding door 102 is any type of door element within a vehicle 108 cabin 110, such as a door, screen, partition, or other panel that slides from an open position (retracted) to a closed position (deployed) to provide privacy to a passenger, shield the passenger from lights in the cabin 110, muffle sounds from other passengers and/or crew or otherwise enable the passenger to relax during travel, such as during a flight on an aircraft. The sliding door 102 may also be referred to as a door, door unit, door element or privacy door.

For example, in the fully retracted position the sliding door 102 is in a stowed and opened state such that a seat arranged adjacent the door assembly is accessible for a passenger and visible to a crew member. In this example, the sliding door 102 is optionally locked in the fully retracted position in some cases, such as during taxi, take-off and landing of the aircraft or during emergency situations. During flight, the sliding door 102 is unlocked, whereby a passenger is allowed to move the sliding door 102 from the fully retracted position to any deployed position or partially deployed position to cover or partially block the view to a portion of seating area of the passenger for improved privacy and convenience. For instance, the sliding door 102 is deployed forward to provide passenger privacy while sleeping.

The vehicle 108 is a vehicle for transporting one or more users from a first location to a second location. The vehicle 108 can include any type of vehicle, such as, but not limited to, an aircraft, boat, ship, space liner, bus, or any other type of vehicle. In this non-limiting example, the vehicle is an aircraft. An aircraft can include a commercial airplane, a private airplane, a hover craft, a seaplane, or any other type of aircraft.

In some examples, the door assembly 101 of the seat unit 100 within the vehicle 108 also includes a door support member 114 and the sliding door 102 movably mounted to the door support member 114. The door support member is part of the furniture fixture that makes up the seat unit.

The sliding door 102 is movable between a fully retracted position 116 and one or more deployed position(s) 118. The deployed position(s) 118 include a fully deployed position or various partially deployed positions. For example, the door can be deployed to a half-way point, deployed three-fourths of the way to the fully deployed (closed door) position, deployed to a position one-fourth of the way from the retracted position, etc.

Figure 8:
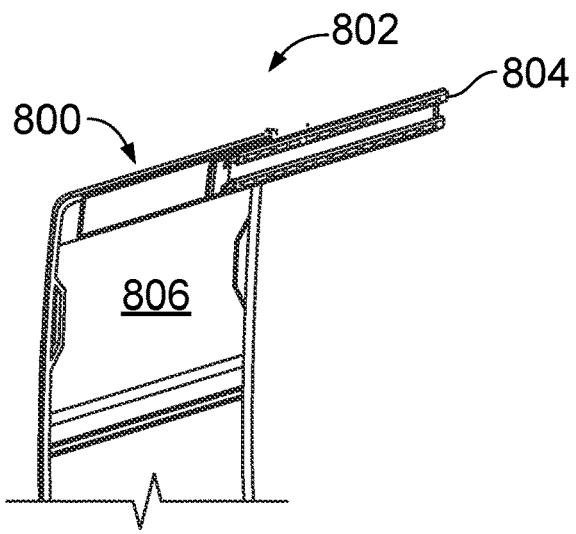
FIG. 8 is an exemplary schematic diagram illustrating a perspective view of a door adjustment device of a door assembly including a set of rails for sliding the door in a normal operation mode.

The door adjustment device 106, in this example, is disposed between the door support member 114 and the sliding door 102 to movably support the sliding door on the door support member 114. In some examples, the carrier unit 104 of the door adjustment device is mounted to the sliding door 102 via a bracket 105. A slide unit 120 is releasably coupled to the carrier unit 104 in a normal operation mode 122. The slide unit 120 is mounted to the door support member 114 and includes a set of one or more rail(s) 121. The rail may also be referred to as a track, bar, slide support or slide member. The carrier unit 104 is mounted to the sliding door 102. The carrier unit 104 slides along the rail(s) 121 of the slide unit 120 when the carrier unit is releasably coupled to the slide unit, as shown in FIG. 8 below.

In some examples, the rail(s) 121 includes one or more tracks, rails or other slide members that enable the sliding door to slide laterally in a left or right direction along the slide members. In one example, the rail(s) 121 of the slide unit includes a single rail, track, or another slide member. In another example, the rail(s) of the slide unit includes a pair of rails, tracks, or other type of slide members, such as, but not limited to, the set of rails 804 shown in FIG. 8 below. The slide unit is optionally mounted or fastened to the door support member by a set of fasteners, such as bolts, screws, or any other type of fastener. The slide unit also includes a slide support unit for supporting the one or more rails on the door support member.

When the carrier unit is coupled to the slide unit in a normal operation mode 122, the carrier unit slides along the slide unit rails in a lateral side-to-side motion. When the carrier unit is de-coupled from the slide unit, the slide unit remains mounted to the door support member and the carrier unit remains mounted to the sliding door. In such cases, an auxiliary slide device associated with the door support member supports the sliding door.

The normal operation mode 122 refers to the normal operation of the sliding door in which the door slides freely between the retracted position 116 and the deployed position 118 along the rails of the slide unit of the door adjustment device. In some examples, the weight of the sliding door 102 is fully supported on the slide unit(s) and/or the slide member rails of the door adjustment device 106 while in the normal operation mode. In other examples, the weight of the sliding door is at least partially supported on the slide unit(s) and/or the slide member rails of the slide unit(s).

Figure 21:
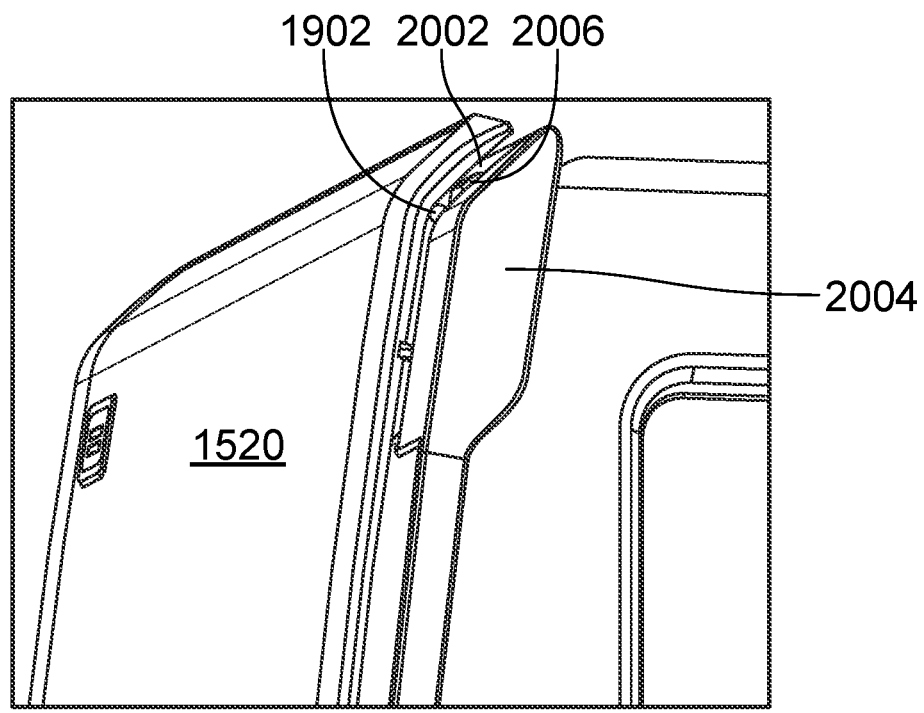
FIG. 21 is an exemplary schematic diagram illustrating a perspective view of a guide element engaging a channel of an upper guide profile on the door support member.
Figure 22:
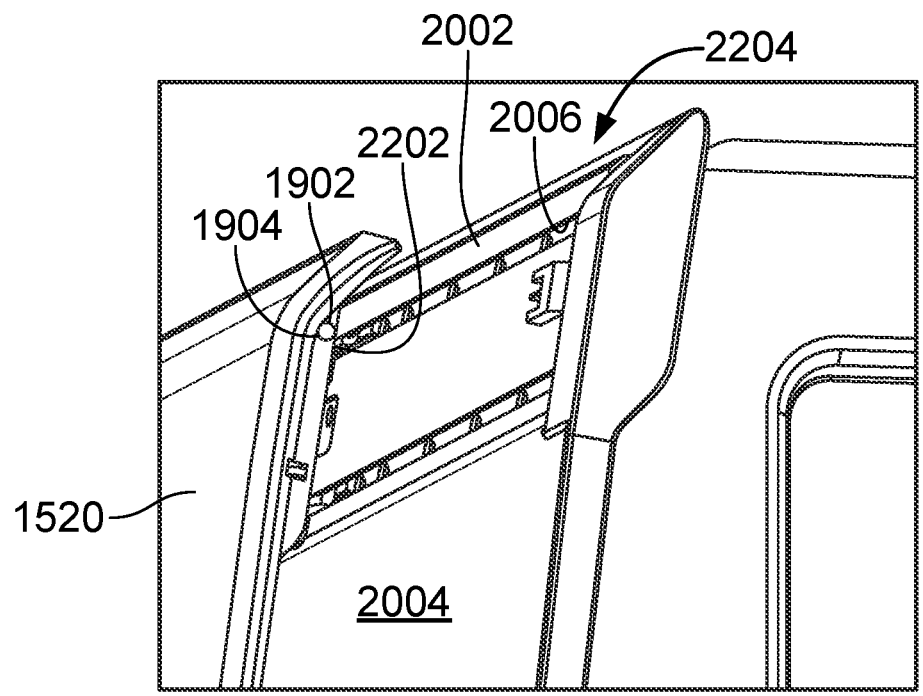
FIG. 22 is an exemplary schematic diagram illustrating a perspective view of an upper guide element engaging an integrated end stop of a guide profile.
Figure 23:
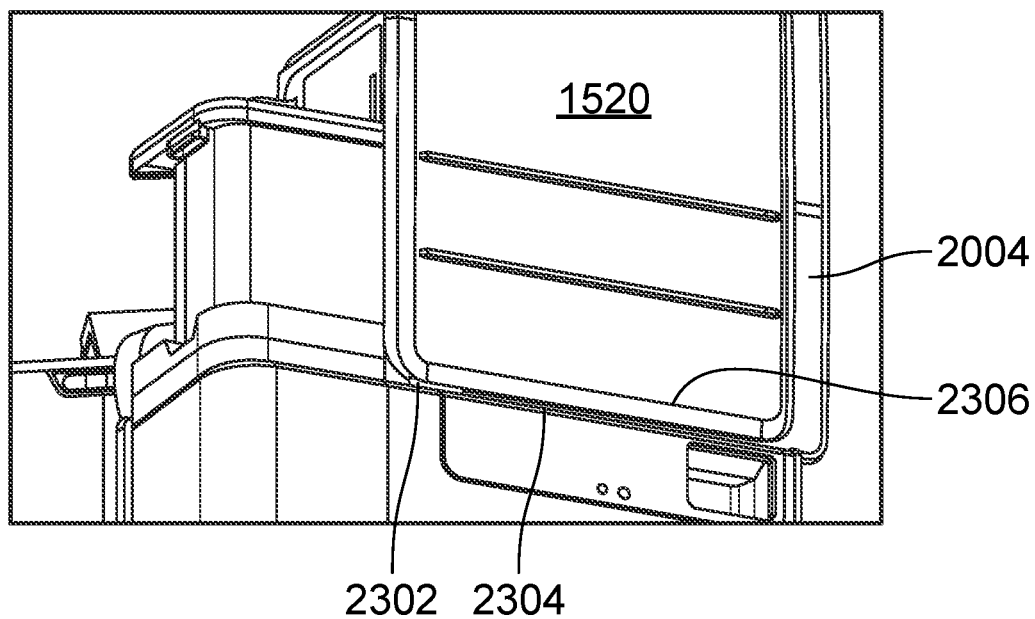
FIG. 23 is an exemplary schematic diagram illustrating a perspective view of a lower guide element engaging a channel of a lower guide profile on the door support member.

While in the backup operation mode the weight of the sliding door is fully or partially supported by one or more guide(s) 117 on the sliding door. The guide(s) 117 are sized to fit within one or more channels formed by one or more guide profile(s) 115 on the door support member, as shown in FIG. 21, FIG. 22, and FIG. 23 below. In some examples, the guide(s) 117 and the guiding profile(s) 115 may be referred to as an auxiliary slide device, such as, but not limited to, the auxiliary slide device 2204 shown in FIG. 22 below.

A locking device 124 of the door adjustment device 106 couples the slide unit 120 to the carrier unit 104 when the door assembly 101 is in the normal operation mode 122. The locking device 124 couples the slide unit 120 to the carrier unit 104, in some examples, by locking one or more detent elements of the slide unit into one or more receiving elements of the carrier unit 104. The locking device is unlocked via actuation of the locking device which lifts a set of one or more pins associated with the locking device out of one or more latching indentations of the detent(s) which "unlocks" the detents from the locking device. When unlocked, the detents can slide out of the receiving elements of the carrier unit, freeing the carrier unit of the sliding door from the potentially jammed/non-operational rail(s) of the slide unit which is attached to the door support member. Once the detent element(s) are unlocked and separated from the carrier unit, the door is able to move free of the rail(s).

The locking device 124 releases the slide unit 120 from the carrier unit 104 when an operating element 128 of a decoupling latch 130 is actuated to decouple the slide unit. The operating element 128 is connected to the locking device 124 is actuated to place the door assembly 101 into a backup operation mode 126 in which the carrier unit 104 is detached from the slide unit 120. The decoupling latch 130 is any type of switch, latch, lever, or other control for actuating the locking device to decouple the slide unit from the carrier unit.

In this example, the door assembly 101 switches from the normal operation mode 122 to the backup operation mode 126 in which the carrier unit, which is mounted to the sliding door, is detached from the slide unit 120 of the door support member 113 in response to user actuation of the decoupling latch 130.

As used herein, the seat unit 100 refers to the furniture, structure, fixtures, base and/or other support members associated with a passenger seat 132. The seat unit 100 can include, for example, but without limitation, the seat 132 for a single passenger to sit on, a console, a back wall panel, a side wall panel, a sliding door, an access space/path enabling passenger ingress and egress from the seat and/or seating area around the seat, cup holders, a tray table, a display screen/video screen, footrest, back rest, head rest, or any other seat-related devices. In this example, the seat unit 100 includes door assembly 101, a passenger seat, such as the seat 132, a base member, a back member, a console and/or an access area enabling the passenger to move from an aisle 134 of the vehicle cabin 110 into the seating area associated with the seat unit 100. The passenger seat is optionally a static seat or a reclining seat.

In some examples, to ensure that the sliding door 102 is maintained in a substantially upright position relative to the aisle 134 and seat unit 100, as well as restrained from falling into or otherwise obstructing a cabin aisle 134 when the slide unit 120 is de-coupled from the carrier unit 104, the sliding door 102 is movably supported on a set of one or more guide(s) 117 attached to the sliding door which removably attach to or fit within one or more guide profile(s) 115 on the door support member 114.

In some examples, the guide(s) of the sliding door 102 are attached to the guide profile(s) 115 on an outer surface side of the door support member, such that the door partially overlaps an exterior surface of the door support member when the door is in the fully retracted position in the backup operation mode. In these examples, the exterior surface of the door faces into the cabin 110, in particular in a direction towards the aisle 134.

Thus, in some examples, the door is substantially adjacent to the door support member in the fully deployed mode. The door support member is substantially covered by the door when the door is positioned in the fully retracted position. Likewise, the door partially overlaps the door support member and partially protrudes beyond the door support member into an access space of the seat unit when the door is in the partially deployed position.

In other examples, the auxiliary slide device including the one or more guide(s) 117 fitting within one or more guide profile(s) 115 is provided in some examples to support the door at least partially in an upright position and ensure that the sliding door does not fall into the cabin or into the aisle when in the backup operation mode 126.

In some examples, the guide(s) are located on the sliding door and the guide profile(s) are located on the door support member, as shown in FIG. 1. However, the examples are not limited to guide(s) on the door and guide profile(s) on the door support member. In other non-limiting examples, the guide(s) may be located on the door support member and the guide profile(s) may be located on the door support member.

Figure 2:
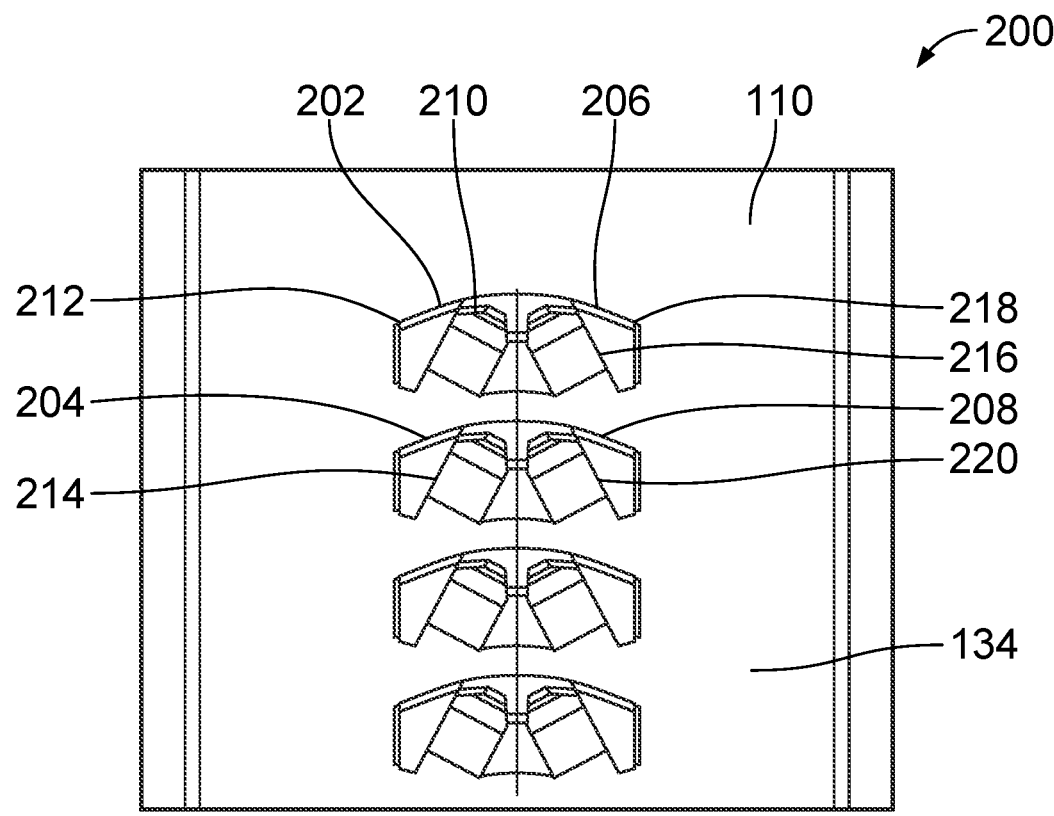
FIG. 2 is an exemplary schematic diagram illustrating a side view of a passenger seating arrangement including seat units having sliding doors.

FIG. 2 is an exemplary schematic diagram illustrating a top view of a passenger seating arrangement 200 including seat units having sliding doors, such as, but not limited to, the seat unit 100 in FIG. 1 above. In this example, the passenger seating arrangement (SA) 200 is arranged within a vehicle cabin 110, in particular an aircraft cabin or other passenger transportation vehicle. The passenger SA 200 includes a plurality of seat units arranged within the vehicle cabin, such as, for example, the seat unit 202, seat unit 204, seat unit 206 and/or seat unit 208. The seat unit 202, seat unit 204, seat unit 206 and/or seat unit 208 are units for supporting a passenger seat, a door support member, and a sliding door, such as, but not limited to, the seat unit 100 in FIG. 1.

In this example, the seat units are positioned in rows of two seats per row with each row arranged one behind another along a longitudinal extension direction of the vehicle cabin. However, the examples are not limited to seat units arranged in linear rows with only two seats per row. In other examples, seats can be placed in rows having three or more seats. Likewise, the seat units can be placed in other arrangements not shown in FIG. 2.

Each seat unit includes a seat, a door support member, and a sliding door, such as, but not limited to, the sliding door 102 in FIG. 1. For example, seat unit 202 includes seat 210 and door support member 212; seat unit 204 includes seat 214; seat unit 206 includes seat 216 and door support member 218; and seat unit 208 includes seat 220. Each sliding door is configured to at least partially close a passenger access to the corresponding seat providing more privacy to the corresponding passenger. In some examples, the sliding door associated with the seat unit 208 at least partially blocks an ingress/egress area between seat 206 and the cabin aisle 134 when the sliding door is in the deployed or partially deployed position.

In some non-limiting examples, a door assembly for a given seat unit is disposed on a side of the seat unit facing the cabin aisle 134. For example, in the fully retracted position, the sliding door for the seat unit 204 is in a stowed and opened state such that the passenger access provides egress from or ingress to the seat unit 208. In the deployed position (not shown), more privacy is provided to the passenger seated on the seat 220, as the seat 220 is at least partially covered from view by the deployed door. However, the examples are not limited to the sliding door disposed on a side of the seat unit adjacent to the aisle. In other examples, the door is attached to a door support member on a side of the seat unit facing or adjacent to another passenger seat. In still other examples, the sliding door is attached to a side of the seat unit near the aisle or any other walkway, access way, stairway, exit door (point of ingress or egress), or other traffic area.

Figure 3:
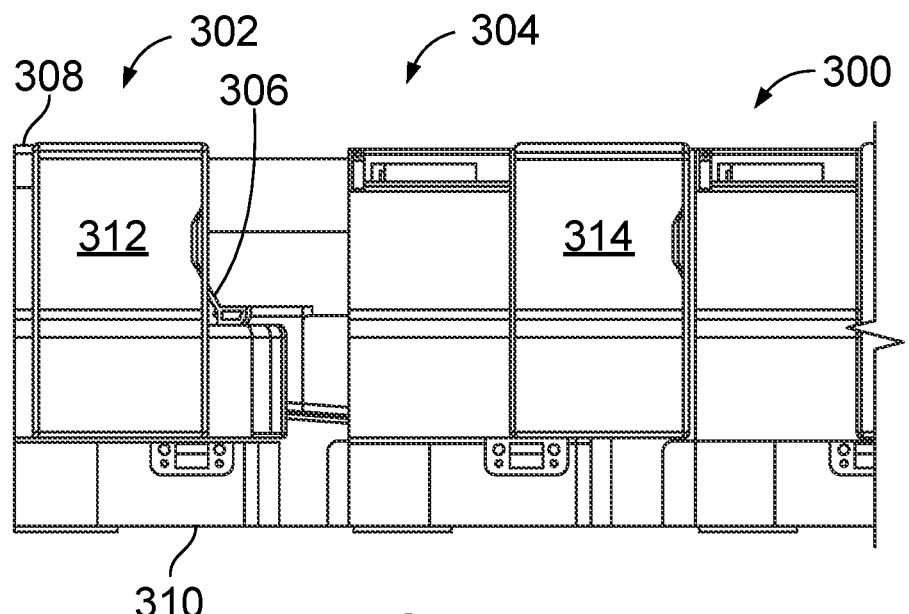
FIG. 3 is an exemplary schematic diagram illustrating a top view of a passenger seating arrangement including seat units having sliding doors.

Turning now to FIG. 3, an exemplary schematic diagram illustrating a side view of a passenger seating arrangement 300 including seat units having sliding doors is depicted, such as, but not limited to, the passenger SA 200 in FIG. 2. In this example, the passenger seating arrangement (SA) 300 is arranged within a vehicle cabin, such as an aircraft cabin or other passenger transportation vehicle. In this example, the SA 300 is within a vehicle, such as the vehicle 108 in FIG. 1 shown above.

The passenger SA 300 includes a plurality of seat units arranged within the vehicle cabin, such as, for example, the seat unit 302 and the seat unit 304. The seat unit 302 and the seat unit 304 can support a passenger seat, a door support member, and a sliding door, such as, but not limited to, the seat unit 100 in FIG. 1.

In this example, the seat units are arranged one behind another along a longitudinal extension direction of the vehicle cabin. However, the examples are not limited to seat units arranged in linear rows. In other examples, the seat units can be placed in other arrangements not shown in FIG. 3.

Each seat unit includes a passenger seat, such as the seat 306 associated with the seat unit 302. The seat 306 is a passenger seat, such as, but not limited to, the seat 132 in FIG. 1. The seat can include a static seat which does not move and/or a reclining seat. The seat 306 optionally can include a reclining back piece, a footrest and/or arm rests.

The seat unit 302, in other examples, includes a door support member 308 and/or a base member 310. The door support member 308 can include a door carrier structure, a bracket, or a wall, which can be coupled to a furniture part, the seat 306 and/or a cabin floor structure. In this example, the sliding door 312 is mounted to the door support member 308 above the base member 310. The sliding door 312 does not contact the cabin floor.

The sliding door 312 is a door associated with a door assembly, such as, but not limited to, the sliding door 102 associated with the door assembly 101 in FIG. 2. The sliding door 312 is movable between a fully retracted position and at least one deployed position. The deployed position of sliding door 312 (not shown) can include a fully deployed position or a partially deployed position in which the door has not been moved to a terminal end stopping point at which point the door has reached maximum extension (fully deployed). In this example, the door 312 associated with the seat unit 302 is shown in the fully retracted position. The sliding door 314 associated with the seat unit 304 is shown in a fully deployed position.

The sliding door 312 is configured for lateral movement into any position between the fully retracted position and the fully deployed position. In some examples, the sliding door 312 is secured by a user in its fully retracted position. When the sliding door 312 is secured, the sliding door 312 optionally remains latched in the fully retracted position until the door 312 is deployed forward by a passenger of the seat unit 302. In the deployed position, the sliding door 314 can remain unlatched. The sliding door 312 is configured to at least partially block access, physically, visually, or both physically and visually, to the seat 306 providing more privacy to the corresponding passenger of seat 306.

Figure 4:
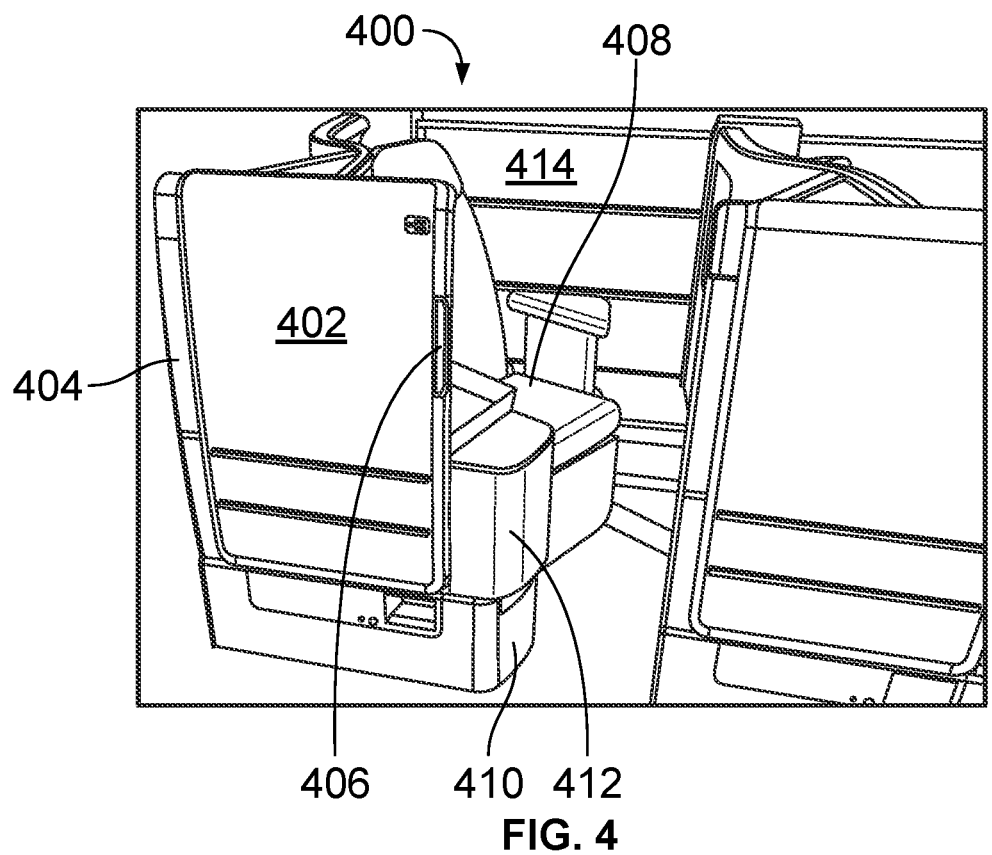
FIG. 4 is an exemplary schematic diagram illustrating a perspective view of a seat unit in a vehicle cabin including a sliding door and a corresponding door support member in a retracted position.

FIG. 4 is an exemplary schematic diagram illustrating a perspective view of a seat unit 400 in a vehicle cabin including a sliding door 402 in a retracted position and a corresponding door support member 404. The sliding door 404 is shown from a viewpoint of a user in the area of the cabin aisle outside the passenger seat unit (exterior or cabin-facing side of the door).

The sliding door 402, in some examples, is a privacy door or screen element which deploys forward and stows aft by means of a slide mechanism provided by the door adjustment device, such as door adjustment device 106 in FIG. 1. The sliding door 402 may be implemented as a solid door, a mesh door, a screen door, or any other type of sliding door. The slide mechanism includes one or more slide units, such as the slide unit 120. The slide mechanism is mounted to a door support member, such as the door support member 114 in FIG. 1.

In an event, for example during an emergency situation or an accidental damaging of the sliding door, the sliding door may be jammed in one of its deployed positions such that the sliding door will not further move relative to the door support member. Therefore, a de-coupling of the sliding door from the slide support unit is ensured via the decoupling latch, such as the latch 130 in FIG. 1. Decoupling the slide unit from the carrier unit enables the sliding door to be moved from the deployed position to the fully retracted position to provide an egress path for the passenger when the slide unit is nonoperational or failing to operate as intended.

In this example, the retracted position is the maximum retraction possible for the sliding door 402. A user utilizes a handle 406 or other gripping device to pull the sliding door 402 along a lateral line of movement out of the fully stowed position and into a partially deployed or fully deployed position. Deploying the sliding door 402 provides at least partial privacy for a user utilizing the seat 408 associated with the seat unit 400.

In this non-limiting example, the sliding door 402 is mounted to the door support member 404 and hangs a predetermined distance above a base member 410 of the seat unit 400. In this example, the sliding door does not rest on the floor of the vehicle cabin or come into contact with the floor or other ground surface of the vehicle cabin.

The seat unit 400 optionally includes furniture structures, such as, but not limited to, a console 412, partition 414 and/or privacy walls, a tray table device, passenger utility device, storage devices, or any other furniture structures. In this example, the one or more optional furniture structures are arranged such that furniture parts at least partially surround the seat 408.

The sliding door 402 can be used in-flight for the convenience of the passenger. In some examples, the sliding door 402 is stowed (fully retracted) and secured during take-off and/or landing to prevent deployment or partial deployment of the sliding door during the take-off and/or landing.

Figure 5:
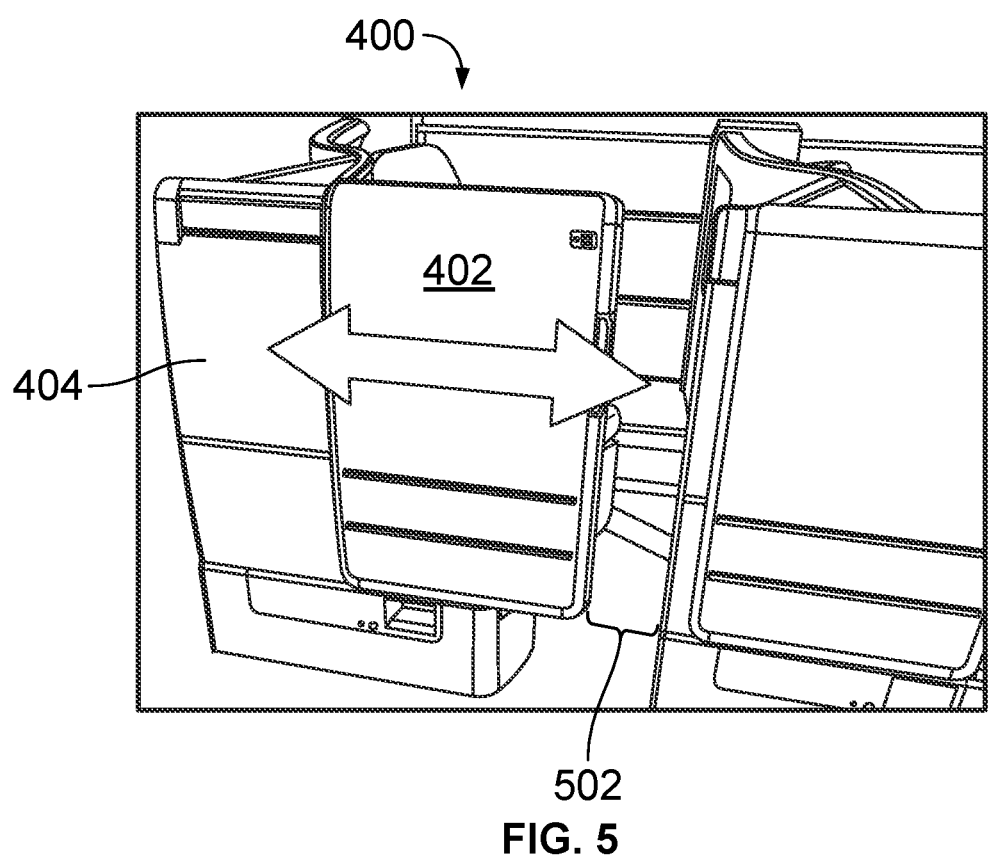
FIG. 5 is an exemplary schematic diagram illustrating a perspective view of a seat unit in a vehicle cabin including a sliding door and a corresponding door support member in a partially deployed position.

FIG. 5 is an exemplary schematic diagram illustrating a perspective view of the seat unit 400 in the vehicle cabin including the sliding door 402 and the corresponding door support member 404 in a partially deployed position. In this example, the sliding door is partially deployed but not yet fully deployed. In other words, the sliding door has not yet reached the maximum extension for deployment. Thus, there is still an opening or gap 502 between the sliding door and a next seat unit positioned in front of the seat unit 400 in the seating arrangement shown in FIG. 4 and FIG. 5. When the slide unit has been decoupled from the carrier unit, the sliding door 402 is able to slide laterally along the guide profile of the door support member in the backup operation mode.

Figure 6:
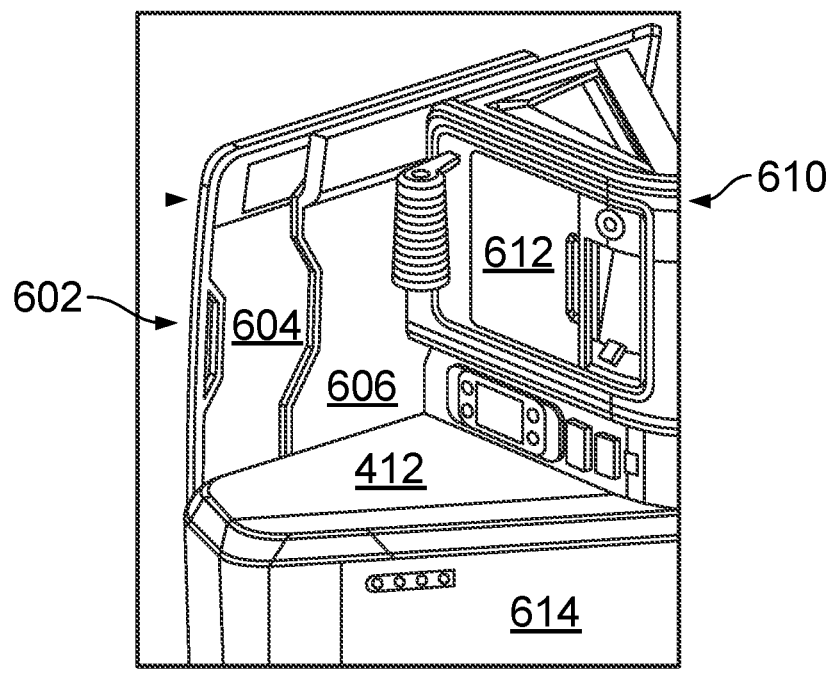
FIG. 6 is an exemplary schematic diagram illustrating a perspective view of a door assembly with a sliding door positioned in a retracted position.

FIG. 6 is an exemplary schematic diagram illustrating a perspective view of a door assembly 602 with a sliding door 604 positioned in a retracted position. The sliding door 604 is shown from a viewpoint of a passenger-facing (interior) side of the door, which is the opposite of the aisle facing (exterior) view of the door that was shown in FIG. 4 and FIG. 5. The seat unit 610 is a seat unit associated with a passenger seat having a sliding privacy door, such as, but not limited to, the seat unit 100 in FIG. 1.

In this example, the door assembly 602 is attached to a door support member 606. The door support member 606 is a portion of the seat unit 610 capable of supporting the sliding door, such as, but not limited to, the door support member 114 in FIG. 1. In this example, the door 604 is shown in the fully retracted position. The seat unit 610 optionally includes furniture structures, such as, but not limited to, a console 412, partition, privacy walls, a tray table device, passenger utility device 612, storage device 614, or any other furniture structures.

Figure 7:
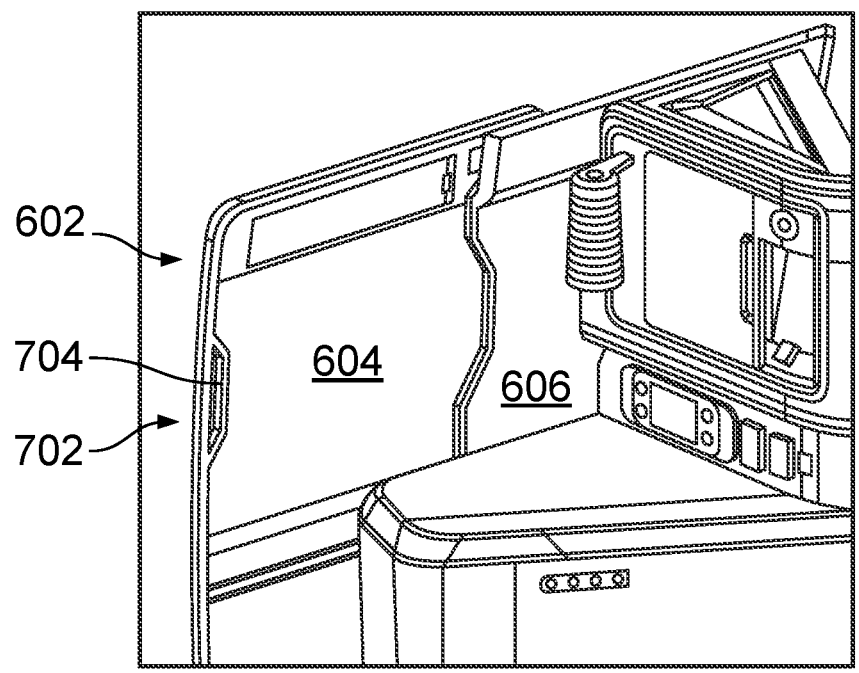
FIG. 7 is an exemplary schematic diagram illustrating a perspective view of a door assembly with a sliding door positioned in a deployed position.

FIG. 7 is an exemplary schematic diagram illustrating a perspective view of the door assembly 602 with the sliding door 604 positioned in a deployed position 702. The sliding door 604 optionally includes a handle 704 or grip to facilitate a user pulling the sliding door 604 into the fully deployed position 702. The sliding door is support at least partially by the door support member 606.

FIG. 8 is an exemplary schematic diagram illustrating a perspective view of a door adjustment device 800 of a door assembly 802 including a set of rails 804 for sliding the door 806 in a normal operation mode. The set of rails 804 include one or more slide members (rails) associated with one or more slide units mounted to a door support member (not shown). The set of rails 804 is associated with a slide unit, such as, but not limited to, the slide unit 120 in FIG. 1.

The door is a sliding door, such as, but not limited to, the sliding door 102 in FIG. 1. The door assembly 802 includes the door 806 and the door adjustment device 800. The door assembly 802 optionally includes structure covering elements, such as a cover plate, screens or other coverings arranged on the door 806 element and the set of rails 804 mounted to a door support member (not shown) to hide or obscure the set of rails and other mechanism from a user's view. A cover is shown on the set of rails 804 in FIG. 9 below. The furniture structure, including the door support member, is not shown in FIG. 8 for better view of the door adjustment device 800.

The door adjustment device 800 is a device for supporting the sliding door and enabling the door to slide along the set of rails 804, such as, but not limited to, the door adjustment device 106 in FIG. 1. In this example, the door adjustment device 800 includes the set of rails 804. However, the examples are not limited to a set of two rails. In other examples, the door adjustment device can include a single rail, a set of two or more rails, or any other number of rails (slide members). In these examples, the sliding door slides along the set of rails when the carrier unit mounted to the sliding door is detachably coupled to the set of rails 804.

Figure 9:
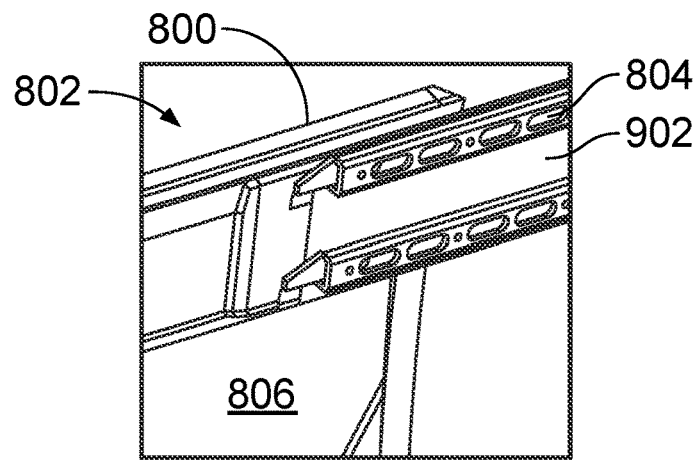
FIG. 9 is an exemplary schematic diagram illustrating a perspective view of a door adjustment device of a door assembly including a cover element for a set of rails.

FIG. 9 is an exemplary schematic diagram illustrating a perspective view of the door adjustment device 800 of the door assembly 802 including a cover 902 element for a set of rails 804. The cover may be implemented as a plate or cover made of plastic, cloth, leather, metal, composite material, or any other suitable material. The set of rails 804 includes one or more rails for supporting the sliding door and enabling the door to slide during normal operation mode, such as the rail(s) 121 of the slide unit 120 in FIG. 1.

The sliding door 806 is supported on the set of rails 804 in normal operation mode. The door adjustment device 800, in this example, is configured as a slide connection device between the door support member and the door 806 element in that the locking device and decoupling latch of the door adjustment device enable coupling of the carrier unit of the door to the slide unit of the door support member.

Figure 10:
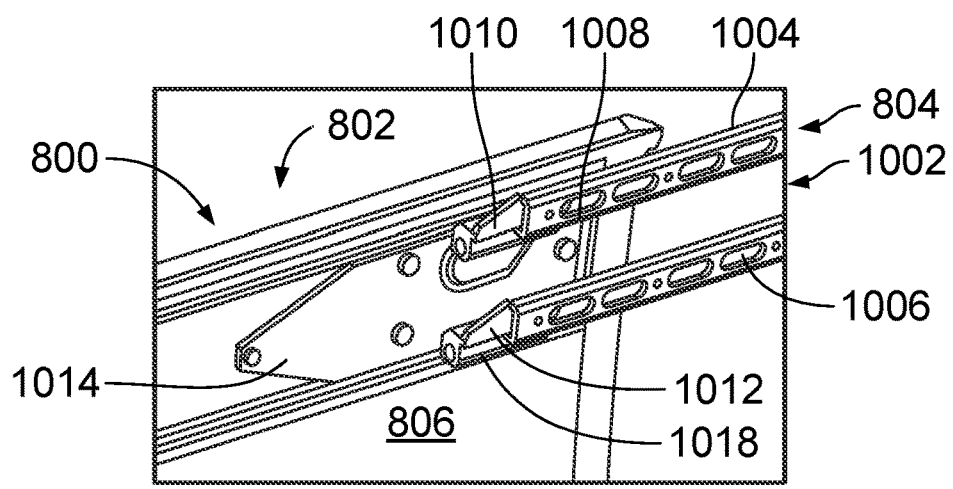
FIG. 10 is an exemplary schematic diagram illustrating a perspective view of a door adjustment device of a door assembly including a carrier unit mounted to a carrier bracket.

FIG. 10 is an exemplary schematic diagram illustrating a perspective view of the door adjustment device 800 of the door assembly 802 including a carrier unit mounted to a carrier bracket, such as the bracket 105 in FIG. 1. In this example, the covering elements associated with the set of rails are hidden for better view.

The door adjustment device 800 includes at least a slide unit 1002 fixed to the door support member. The slide unit 1002 includes the one or more rails, such as the rail(s) 121 of the slide unit 120 in FIG. 1. The slide unit in this example is mounted to an exterior surface of the door support member (not shown). In some examples, the slide unit is mounted on the surface of the door support member facing the aisle relative to the associated seat unit.

The set of rails 804 of the slide unit 1002, in this example, includes two separate rails, a first rail 1004 and a second rail 1006, which are attached to the door support member (not shown). Further, the door adjustment device 800 includes a carrier unit 1008 including two slide units, a first slide unit 1010 and a second slide unit 1012. Each slide unit is associated with a respective rail. For example, the slide unit 1010 is associated with the rail 1004 and the slide unit 1012 is associated with the rail 1006.

The slide carrier unit 1008 is a carrier unit, such as, but not limited to, the carrier unit 104 in FIG. 1. The slide carrier unit 1008 is mounted on the door 806, in particular on a side of the door 806 facing the associated door support member. The slide unit 1010 and the slide unit 1012 are slidably supported on the door support member structure via the slide support unit 1002.

In some examples, the slide carrier unit 1008 includes at least a fixed carrier bracket 1014 fixed on the door 806, where both slide unit 1010 and slide unit 1012 are each separately detachably mounted to the carrier bracket 1014. Both slide unit 1010 and slide unit 1012 are fixedly coupled to the carrier bracket 1014 in a normal operation mode of the sliding door 806 element. The slide unit 1010 and slide unit 1012 are configured the same (identical). Movement of the slide unit 1010 and slide unit 1012 along the slide support unit 1002 is executed substantially parallel to each other in the normal operation mode of the door 806. Each slide unit 1010 and 1012 is coupled to the carrier bracket 1014 via a detachable and a detachable joint mechanism 1018.

In case of jamming of one or both of the slide units (slide unit 1010 and/or slide unit 1012) and/or a malfunction of one of the rail 1004 and/or rail 1006, the door adjustment device is detachable to ensure the sliding door 806 can be moved from the deployed position back to the retracted position.

Figure 11:
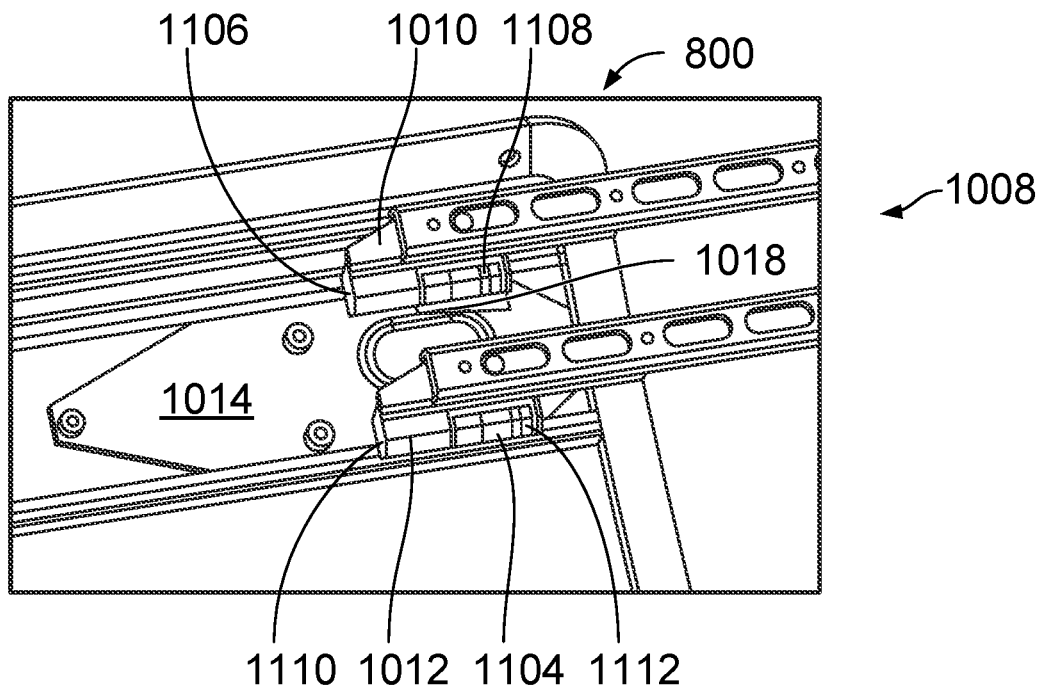
FIG. 11 is an exemplary schematic diagram illustrating a carrier unit coupled to a slide unit of the door adjustment device.

FIG. 11 is an exemplary schematic diagram illustrating the carrier unit 1008 coupled to a slide unit of the door adjustment device 800. Each detachable joint mechanism includes a detachable detent element and a corresponding detent receiving element releasably retaining the detent element. For example, the detachable joint mechanism 1018 includes a detachable detent element 1106 and the corresponding detent receiving element 1108 releasably retaining the detent element 1106. Likewise, the detachable joint mechanism 1104 includes a detachable detent element 1110 and the corresponding detent receiving element 1112.

In some examples, the detachable detent elements 1106 and 1110 are detent pins or teeth. The detent receiving elements 1108 and 1112 are detent mating hole, recess, notch, indentation, or other slot into which the detent element is detachably inserted and retained in a normal operation mode of the sliding door. In other words, a detent pin inserts into the detent receiving element to grip, hold or otherwise lock the carrier unit to the slide unit. The detent element 1106 is arranged fixedly attached to the slide unit 1010. Likewise, the detent element 1110 is fixedly attached to the slide unit 1012. The receiving element 1108 and the receiving element 1112 are arranged fixedly attached on the carrier bracket 1014 by a corresponding housing.

Figure 12:
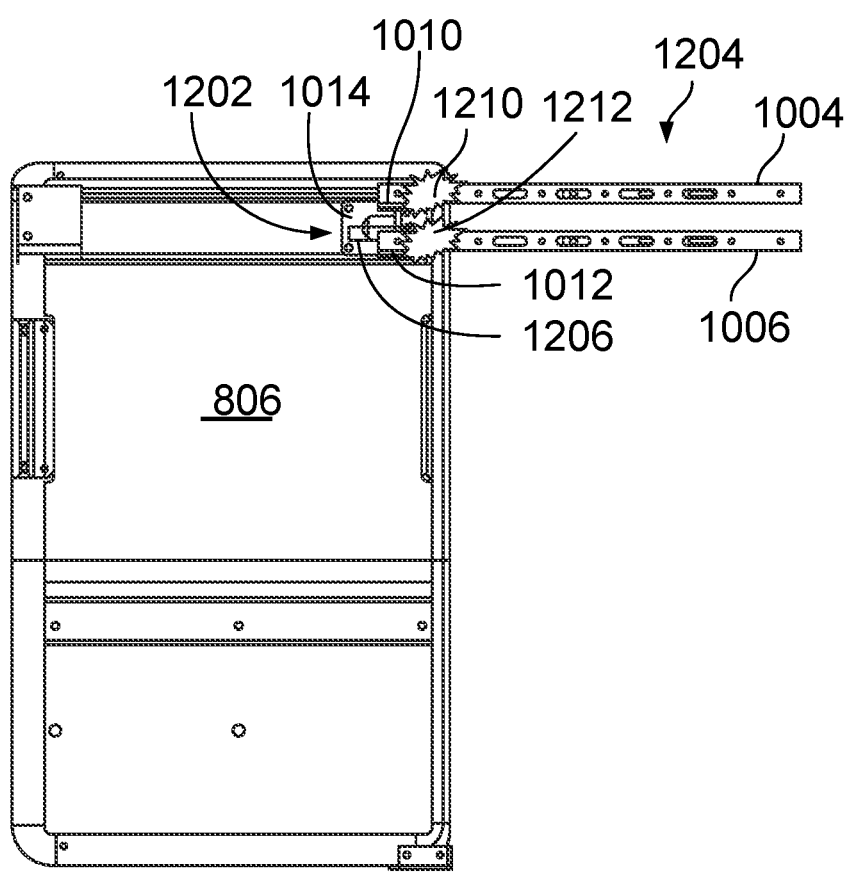
FIG. 12 is an exemplary schematic diagram illustrating a sliding door removably coupled to a set of rails of the door adjustment device.

FIG. 12 is an exemplary schematic diagram illustrating a sliding door 806 removably coupled to a set of rails of the door adjustment device. The door adjustment device, in this example, further includes a locking device 1202. The locking device 1202 is configured to couple the slide unit 1010 and the slide unit 1012 to the carrier bracket 1014 in a normal operation mode.

In this example, the door adjustment device 800 and/or an operating sequence of the locking device 1202 is shown where a malfunction or jam 1210 and 1212 of the slide unit(s) and/or the slide support unit has occurred.

The door 806 is coupled to the slide support unit 1204, the door 806 being in the fully deployed position. The locking device 1202 is arranged substantially above the carrier bracket 1014 facing in a direction toward the hidden furniture structure. In case of jamming, one or both slide units (slide unit 1010 and/or slide unit 1012) and/or one or both rails (rail 1004 and/or rail 1006), the locking device 1202 is manually actuatable by a crew member or the passenger via the decoupling latch.

In this example, the locking device 1202 is triggered to unlock via an operating element 1206 connected to the decoupling latch. Upon actuation of a decoupling latch or switch, the operating element 1206 triggers the locking device 1202 to unlock and thereby release both slide units from the carrier bracket 1014. The slide units remain coupled to the corresponding rails (rail 1004 and rail 1006) while the door 806 is moved back into the stowed retracted position.

In some examples, the operating element 1206 is configured as part of or working in conjunction with a decoupling lever and/or handle which is pushed up or down in a vertical direction or a horizontal direction. In one example, the operating element 1206 is actuated when a decoupling latch is pushed toward the door 806 or pulled away from the door 806. In another example, the operating element of the locking device 1202 is activated by a decoupling latch that is pushed or pulled in a given direction to unlock the locking pins from the slide unit(s).

Figure 13:
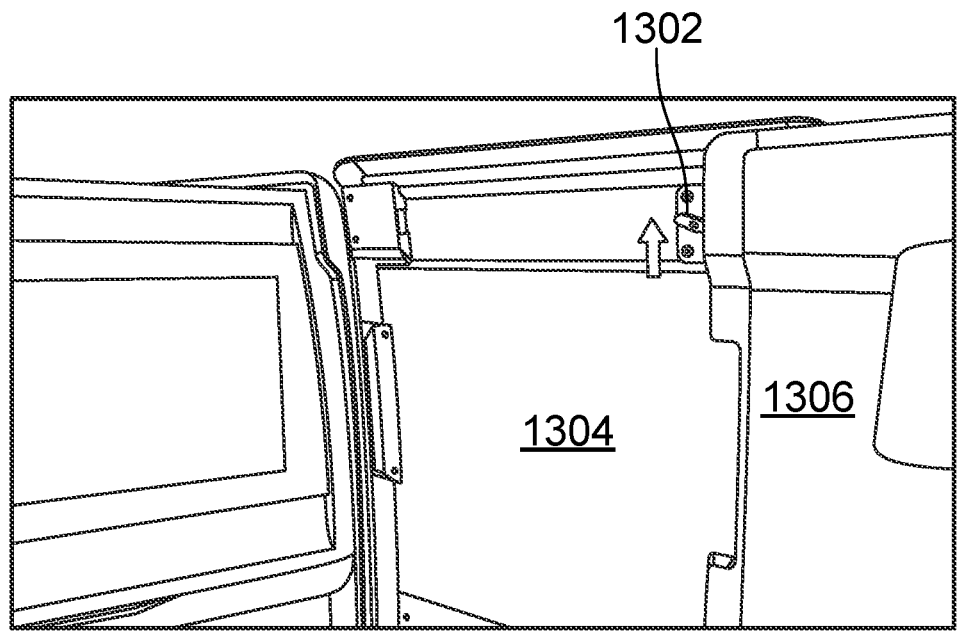
FIG. 13 is an exemplary schematic diagram illustrating a decoupling latch on a sliding door.

FIG. 13 is an exemplary schematic diagram illustrating a decoupling latch 1302 on a sliding door 1304. In some examples, if the door is jammed, a user activates the latch 1302 which separates the door 1304 from the rails and allows the door to be moved back towards the door support member 1306 and out of the way for passenger egress. If the door is not jammed, the system is reset by fully retracting the door back into the initial (open) position.

Figure 14:
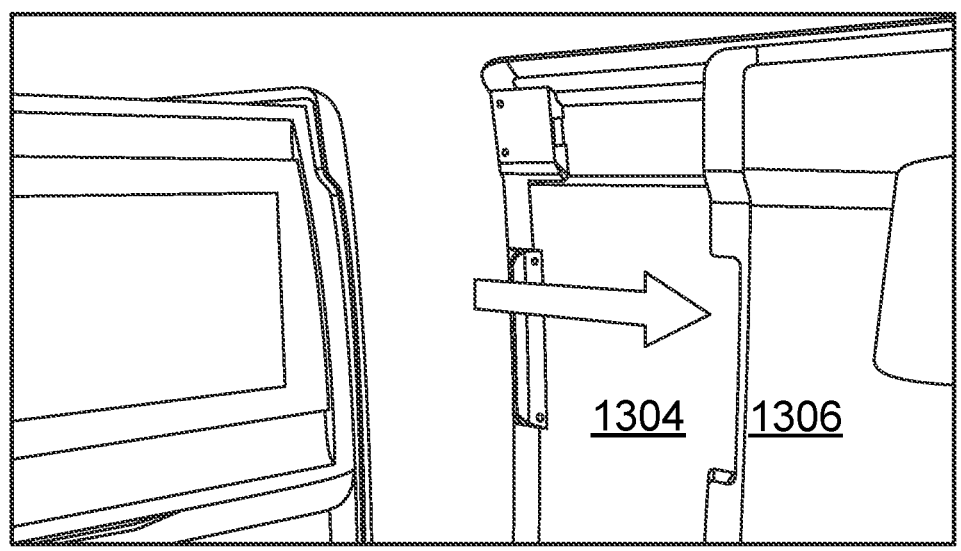
FIG. 14 is an exemplary schematic diagram illustrating retracting the sliding door in the backup operation mode.

FIG. 14 is an exemplary schematic diagram illustrating retracting the sliding door 1304 in the backup operation mode. In this example, a set of guides sitting within a set of channels on the door support member 1306 supports the door such that the door remains on suite (attached to the door support member) as the passenger slides the door out of the way. The door can optionally be locked in the retracted position after the door is decoupled from the slide unit and fully retracted.

Figure 15:
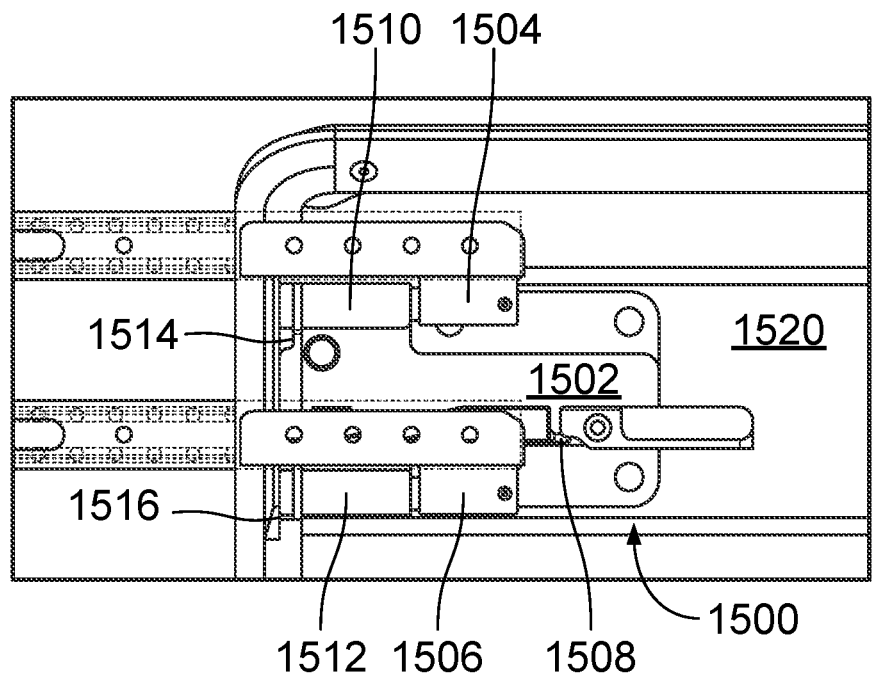
FIG. 15 is an exemplary schematic diagram illustrating slide units removably coupled to a carrier unit on a carrier bracket.

FIG. 15 is an exemplary schematic diagram illustrating slide units removably coupled to a carrier unit 1500 on a carrier bracket 1502. In this example, the carrier bracket 1502 is removably latched to the slide units (slide unit 1504 and slide unit 1506). The operating element 1508 is in an initial position when the sliding door 1520 is in the normal operation mode. The operating element 1508 is mounted on side of the carrier bracket 1502. In the initial position, the operating element 1508 is actuated by movement of the decoupling latch. The operating element is configured to compress the spring which triggers the one or more locking element(s) to disengage from (release) the detent latching indentation(s), which frees the detent(s) from one or more receiving element(s). This unlocks the detents enabling the carrier unit to decouple from the slide unit(s) (slide unit 1504 and/or slide unit 1506).

In some examples, the receiving element 1512 and receiving element 1510 are configured as sleeves. Each receiving element includes an inner recess or detent hole which is removably fixed to the carrier bracket 1502. Each receiving element comprises a latch opening. For example, the receiving element 1510 includes a latch opening 1514 and the receiving element 1512 includes a latch opening 1516. The latch opening, in this example, are arranged in an area farthest away from the slide units (slide unit 1504 and slide unit 1506).

In other examples, various locations along the receiving elements 1510 and/or receiving element 1512 include the latch openings. In other words, the examples are not limited to the position of the latch openings shown in FIG. 15. In other examples, one or more latch openings are provided in other locations along the receiving element(s).

Figure 16:
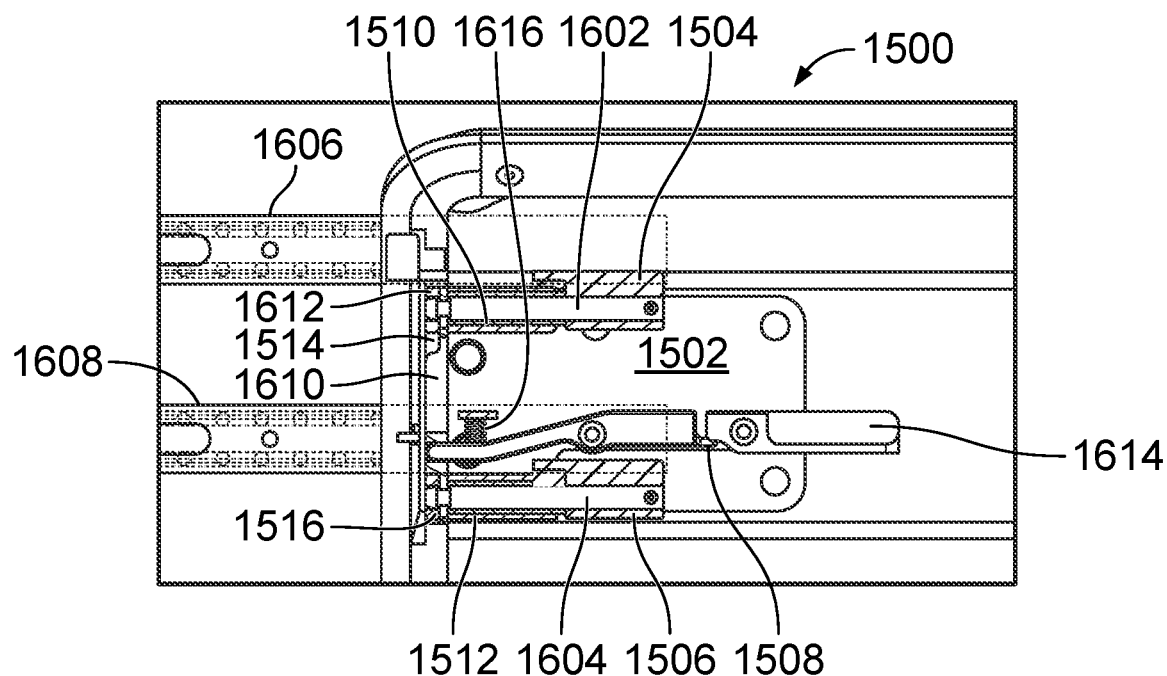
FIG. 16 is an exemplary schematic diagram illustrating a cross-section view of the slide unit removably coupled to the carrier unit on the carrier bracket.

FIG. 16 is an exemplary schematic diagram illustrating a cross-section view of the slide units removably coupled to the carrier unit 1500 on the carrier bracket 1502. As shown in FIG. 16, a part of the receiving elements 1510 and 1512 and a part of the slide units 1504 and 1506 are hidden.

In the normal operation mode, the detent element 1602 and the detent element 1604 are fully arranged inside the corresponding receiving elements. Each detent element fixed to an inside of the corresponding slide units. In some examples, each detent element is fastened to the corresponding slide unit via a fastener, such as, but not limited to, a screw, bolt, pin, or other fastener.

In some examples, each slide unit comprises a rail section and a bracket section. The rail section is retained in the corresponding rail (rail 1606 and/or rail 1608) and the bracket section is retained in the corresponding receiving element (receiving element 1510 and/or receiving element 1512) of the carrier bracket 1502. Each detent element (detent 1602 and/or detent 1604) includes at least one latching indentation which corresponds to a latch opening, such as, but not limited to, the latch opening 1514 and/or the latch opening 1516.

In this example, a locking element 1610 is movable in a vertical direction to release the detent pins in the locking element 1610 from the corresponding receiving elements. The locking element 1610 includes one or more pins, teeth, tabs, clamps, or other elements for engaging the latching indentation(s) on the detent(s). For example, the detent pin 1612 is a locking element. The detent pin 1612 is released from the receiving element 1510 when the locking device is unlocked via actuation of the operating element.

The locking element 1610 is coupled to the decoupling latch 1614. The locking element is, for example, movably guided on the carrier bracket 1502. In the normal operation mode, the locking element 1610 is located in a first position in which the locking element 1610 latches the slide units to the carrier bracket 1502.

In some examples, the locking element 1610 includes locking pins (teeth) 1612 which project through the latch openings. In the latched state, the locking pins (teeth) project through the latch openings of the receiving elements and engage the detent elements in their latching indentations.

Upon actuation of the latch 1614, the locking element 1610 is moved from the first position to a second position in which the locking element releases the slide units (slide unit 1504 and slide unit 1506) from the carrier bracket 1502. For example, the locking pins are disengaged from the latching indentations. The detent elements (detent element 1602 and detent element 1604) are set free from an engagement with the corresponding receiving elements so that the sliding door is independently moved away from a location of the slide units inside the corresponding rails, such as, but not limited to, the rail 1606 and the rail 1608.

The operating element, in some examples, is spring-loaded via at least one spring, such as, but not limited to, the spring 1616. The operating element is tensioned back into its initial position when a user releases the operating element via the decoupling latch. When the latch 1614 is actuated, the operating element works against a spring force of the spring 1616.

Figure 17:
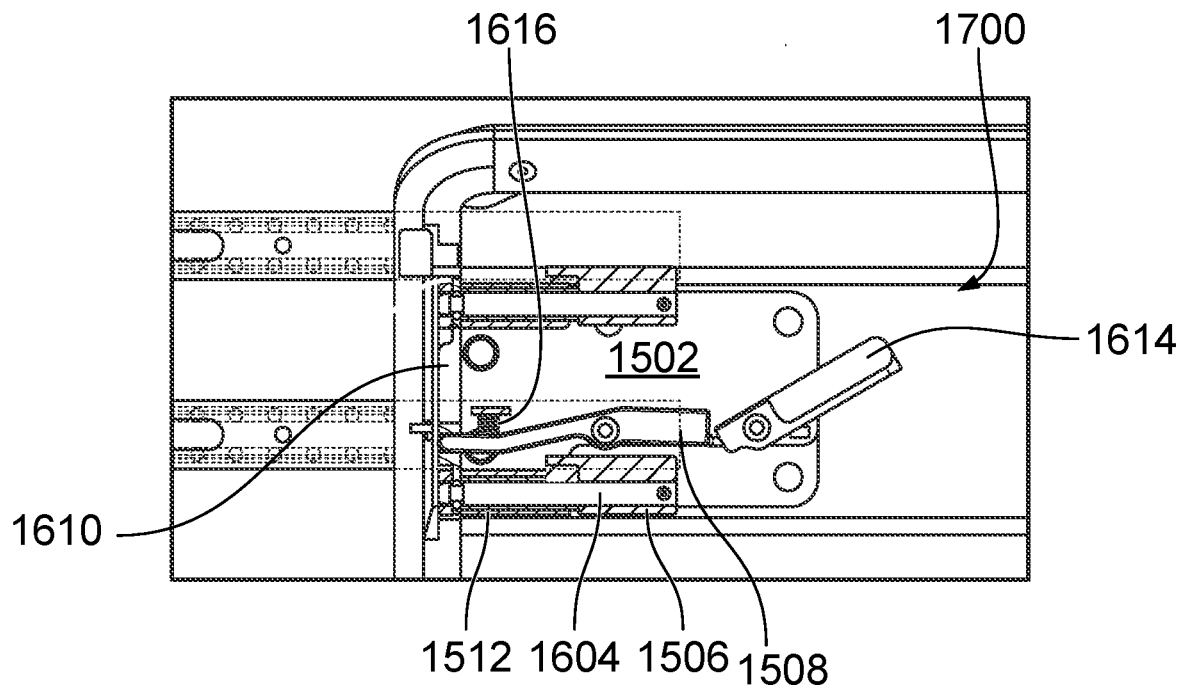
FIG. 17 is an exemplary schematic diagram illustrating a cross-section view of the door adjustment device with the decoupling latch actuated.

FIG. 17 is an exemplary schematic diagram illustrating a cross-section view of the door adjustment device 1700 with the decoupling latch 1614 actuated. The latch 1614 in FIG. 17 is shown in an actuated position. The operating element is actuating the locking element 1610, moving the locking element from an engagement position to a release position. The operating element 1508 is actuated to compress the spring 1616. In this example, the spring compression moves the locking pins out of the latching indentations in the locking elements to release the slide units from the carrier bracket 1502. The locking element 1610 releases the detent element 1604 from the receiving element 1512, which frees the slide unit slide unit 1506 from the carrier bracket 1502.

Figure 18:
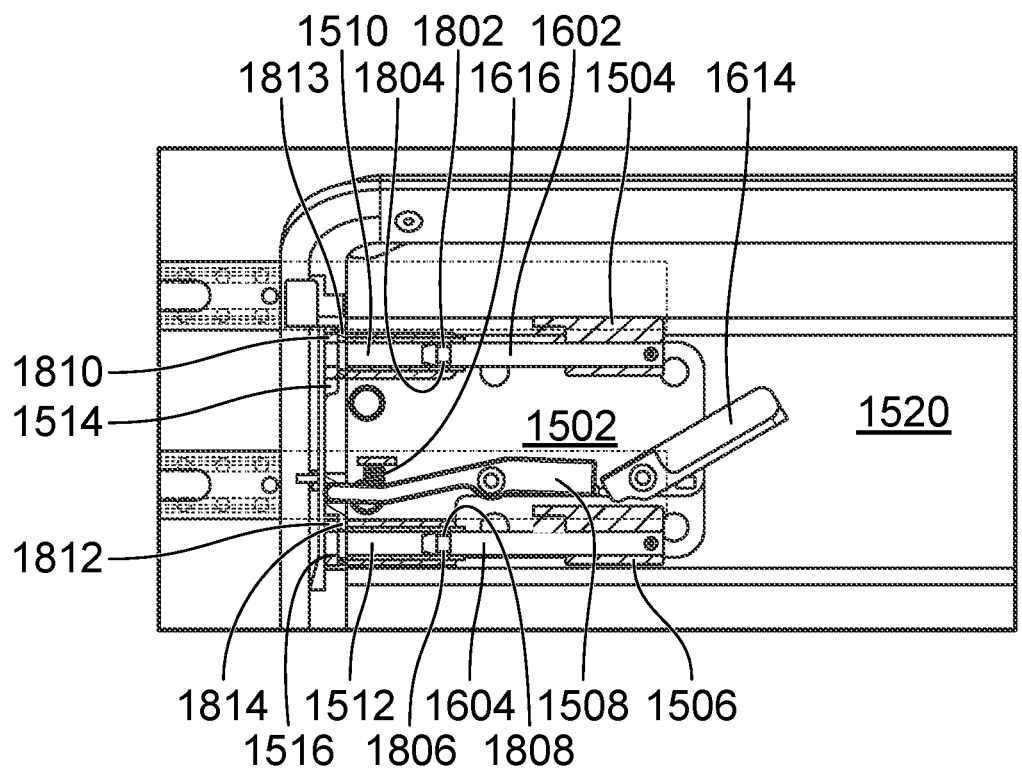
FIG. 18 is an exemplary schematic diagram illustrating decoupling of the locking device from the slide unit following actuation of the decoupling latch.

FIG. 18 is an exemplary schematic diagram illustrating decoupling of the locking device from the slide unit following actuation of the decoupling latch. In this example, the door 1520 is shown decoupled from the slide unit and moving away from the deployed position. The receiving elements 1510 and 1512 are moved with the carrier bracket 1502 away from the corresponding slide units 1504 and 1506 and their detent elements 1602 and 1604. The door 1520 element is moved back into its retracted position, such that a passenger access path is free.

In some examples, each detent element (detent 1602 and/or detent 1604) includes at least one latching indentation, such as, but not limited to, the latching indentation 1802, the latching indentation 1804, the latching indentation 1806 and/or the latching indentations 1808. The latching indentations are arranged aligning with the latch openings. In this example, the latching indentation 1802 aligns with the latch opening 1810, the latching indentation 1804 aligns with the latch opening 1514, the latching indentation 1808 aligns with the latch opening 1812 and/or the latching indentation 1806 aligns with the latch opening 1516. The locking pins 1813 and 1814 are released from the latching indentations by compression of the spring 1616 by actuation of the operating element 1508 of the locking device, which is triggered by actuation of the latch 1614.

Figure 19:
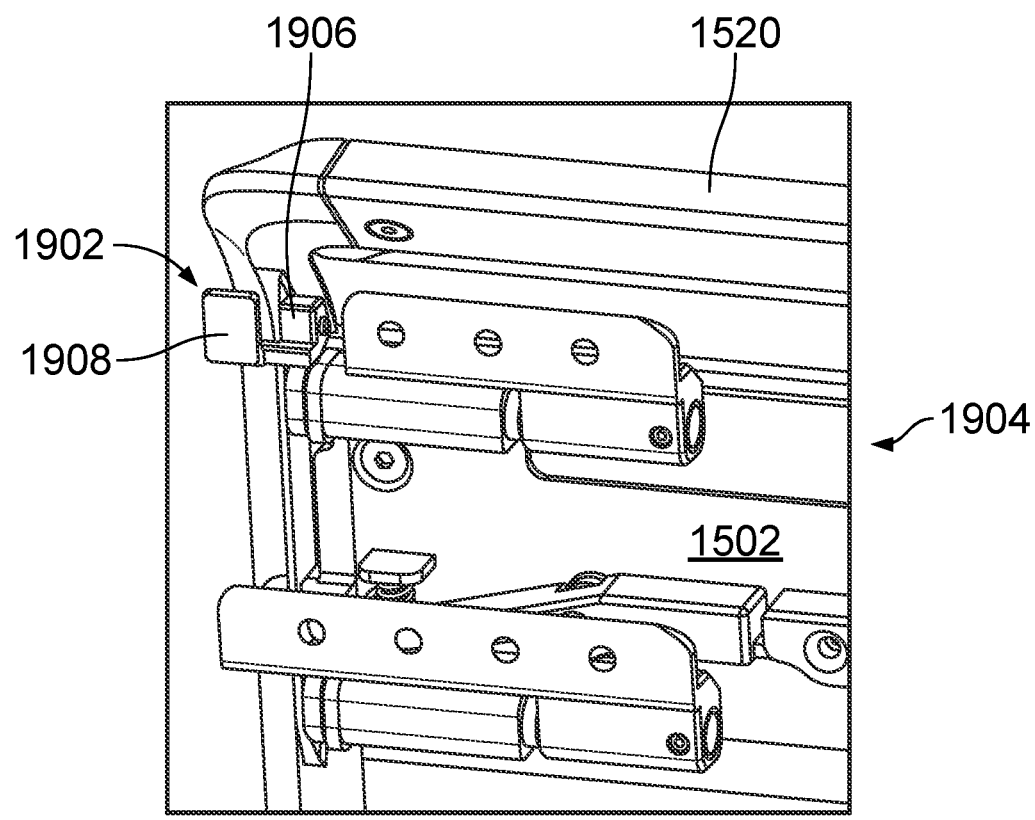
FIG. 19 is an exemplary schematic diagram illustrating a perspective view of a guide element associated with an auxiliary slide device of a door assembly.

FIG. 19 is an exemplary schematic diagram illustrating a perspective view of a guide element 1902 associated with an auxiliary slide device of a door assembly 1904. The guide element 1902 fits within a channel of an additional auxiliary slide device situated on the door support member to prevent the door 1520 from falling off the door support member into the cabin aisle.

In some examples, the guide element 1902 is configured to movable support the door 1520 on the door support member after disengagement of the carrier unit from the slide units. In this example, the guide element 1902 includes a protruding end 1908 which protrudes from outside the guide profile on the door support member. The guide element further includes a tab 1906 which fits inside a channel or cavity defined by the guide profile of the door support member. In this example, the upper guide element 1902 is arranged above the door adjustment device.

Figure 20:
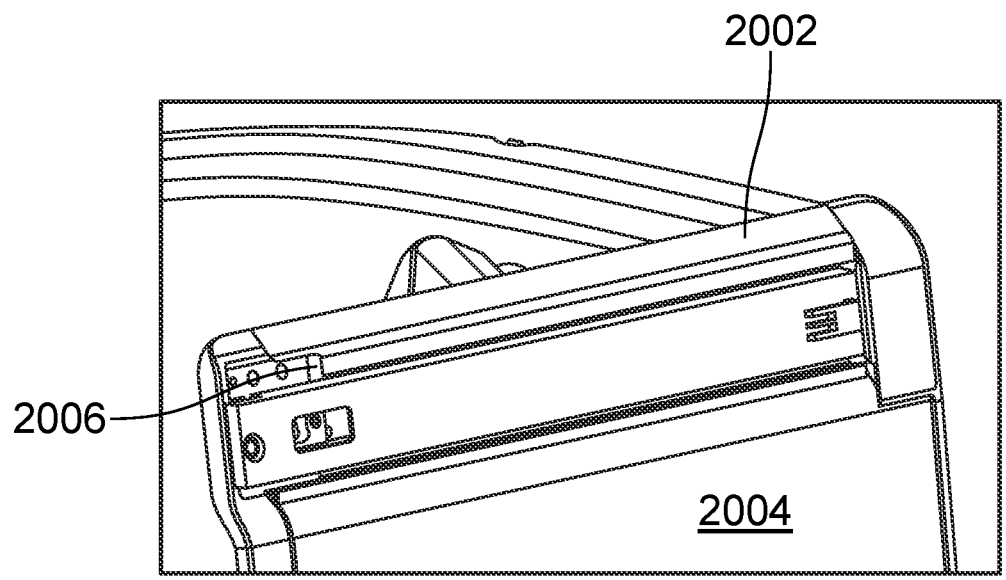
FIG. 20 is an exemplary schematic diagram illustrating a perspective view of an upper guide profile on a door support member.

FIG. 20 is an exemplary schematic diagram illustrating a perspective view of an upper guide profile 2002 on a door support member 2004. The guide profile 2002 forms a cavity or channel 2006 into which the pin of the guide element fits. In some examples, the pin includes a hook or attachment means locking onto a member associated with the guide profile for supporting the weight of the door while the door is in the backup operation mode.

In some examples, the upper guide supports the weight of the door in the backup operation mode. In other examples, the lower guide support the weight of the door in the backup operation mode. In still other examples, both the upper guide and the lower guide work in conjunction together to support the weight of the door in the backup operation mode. In still other examples, the upper guide and/or the lower guide holds and supports the door in an upright configuration relative to the passenger seat such that the door does not fall into an aisle or become dislodged from the door support member in the backup operation mode.

FIG. 21 is an exemplary schematic diagram illustrating a perspective view of a guide element 1902 of the sliding door 1520 engaging a channel 2006 of an upper guide profile 2002 on the door support member 2004 associated with the door 1520.

The function of the guide element 1902 and the guide profile 2002 is to hold the sliding door 1520 on the door support member 2004 in a slidable manner while in a backup operational mode without the sliding door being a hazard to passengers of the cabin.

FIG. 22 is an exemplary schematic diagram illustrating a perspective view of an upper guide element 1902 engaging an integrated end stop 2202 of a guide profile 2002. In some examples, the auxiliary slide device 2204 includes at least one guide element, such as, but not limited to, the guide element 1902. The guide element 1902 in this example is arranged on the door 1520.

In some examples, the guide element 1902 includes a free upward protruding end 1908. The auxiliary slide device 2204 further includes the upper guide profile 2002. The guide element 1902 is arranged on the top portion of the sliding door 1520. However, the examples are not limited to a guide element on the top portion of the door support member. In other examples, the guide is provided at the bottom portion of the sliding door. In still other examples, the guide element is provided on the door support member and the guiding profile is provided on the sliding door.

In this example, the guide profile 2002 is provided on a top edge of the door support member 2004. The guide profile 2002 is configured substantially U-shaped with its open end facing in a direction toward a cabin floor. However, the examples are not limited to a U-shaped channel. In other examples, the guide profile 2002 defines a channel that is V-shaped, cylindrical, triangular-shaped, square-shaped, rectangular-shaped, irregularly shaped, or any other shape configured to accommodate the guide such that the guide does not scrap against the sides of the channel or otherwise obstruct smooth sliding of the guide through the channel defined by the guide profile.

The guide element 1902, for example the upward protruding end 1908, is projecting into the guide profile 2002. In particular, the protruding end 1908 is in slidable engagement with the guide profile 2002. The guide profile 2002 comprises an integrated end stop 2202 which comes into engagement with the guide element 1902 in the fully deployed position of the sliding door. Even when the slide carrier bracket is de-coupled from the slide units, the sliding door is retained on the door support member via the auxiliary slide device 2204. The guide element 1902 moves with the sliding door relative to the guide profile 2002.

In this example, the auxiliary slide device 2204 includes an upper guide and an upper guide profile. In other examples, the auxiliary slide device also includes a lower guide on a lower portion of the door which engages a channel formed by a lower guide profile, as shown below in FIG. 23 and FIG. 24. In these examples, the upper and lower guides fitted within the upper and lower guide profiles work in conjunction to maintain the door in an upright configuration and prevent the door from falling into the aisle when the door is disengaged from the slide units.

FIG. 23 is an exemplary schematic diagram illustrating a perspective view of a lower guide element 2302 engaging a channel 2304 of a lower guide profile 2306 on the door support member 2004. In this example, the door 1520 is in a retracted position.

In some examples, the door support member 2004 is part of the furniture structure. The door support member is optionally implemented as a panel or shell attached to a lateral side of the furniture structure. The auxiliary slide device includes at least one guide element, such as the guide element 2302. The guide element 2302 is arranged on the door support member 2004. For example, the guide element 2302 includes a free upward protruding end, such as the protruding end 1908 shown in FIG. 19 above. The guide element is configured to movably support the sliding door 1520 on the door support member. The auxiliary slide device further comprises a guide profile 2304. The guide profile 2304 is arranged on the sliding door.

In some examples, the guide profile 2304 is provided on a bottom edge of the door 1520. The guide profile is configured substantially U-shaped with its open end facing in a direction toward a cabin floor. The guide element, for example the upward protruding end is projecting into the guide profile. In particular, the protruding end is in slidable engagement with the guide profile.

The guide profile 2304 in other examples include an integrated stop which comes into engagement with the guide element in the fully deployed position of the sliding door. Even when the carrier bracket is de-coupled from the slide units, the sliding door is retained on the door support member via the auxiliary slide device. The guide element in these examples is immovably arranged on a bottom side of the door support member 2004. The guide profile 2304 moves with the door 1520 relative to the guide element 2302.

Figure 24:
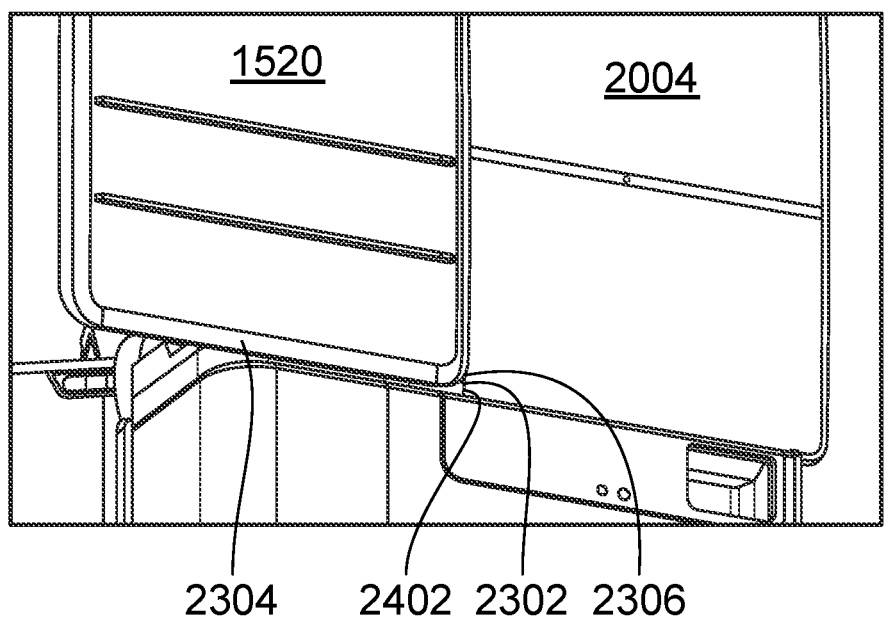
FIG. 24 is an exemplary schematic diagram illustrating a perspective view of a lower guide element engaging an integrated end stop of a guide profile on the door support member.

FIG. 24 is an exemplary schematic diagram illustrating a perspective view of a lower guide element 2302 engaging an integrated end stop 2402 of a guide profile 2304 on the door support member 2004. In this example, the door 1520 is in a deployed position. The end stops 2402 prevents the door from extending beyond the maximum extension permitted by the end stop 2402.

Figure 25:
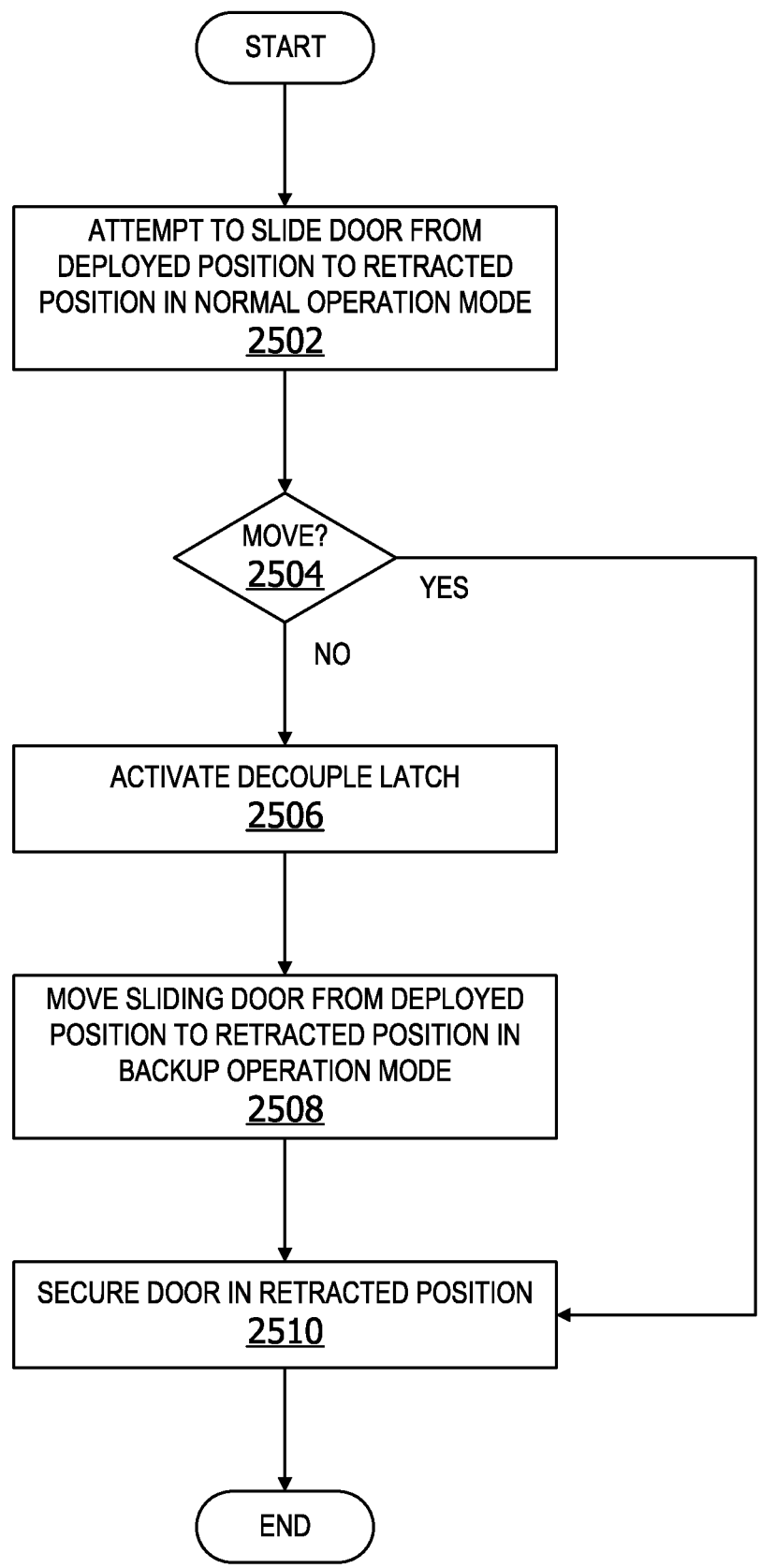
FIG. 25 is an exemplary flow chart illustrating operation of the door adjustment device to enable decoupling of a sliding door from a slide unit of a door support member to return the sliding door to a retracted position in a backup operation mode.

Referring now to FIG. 25, an exemplary flow chart illustrating operation of the door adjustment device to enable decoupling of a sliding door from a slide unit of a door support member to return the sliding door to a retracted position in a backup operation mode is shown.

At operation 2502, a user attempts to slide the door from a deployed or partially deployed position to a retracted position in a normal operation mode. In the normal operation mode, the carrier unit is coupled to the slide unit enabling the sliding door to slide along a set of rails mounted to the door support member. If the user is unable to move the sliding door at operation 2502, the user actuates a decouple latch at operation 2506. If the user is behind the sliding door in a seating area of the seat unit, the passenger actuates a decouple latch on the interior surface of the sliding door. If the user is located in an aisle of the vehicle cabin, the user can actuate a secondary decouple latch located on an exterior surface of the sliding door. At operation 2508 the user moves the sliding door from the deployed or partially deployed position back to the retracted (open) position in the backup operation mode. The user secures the door in the retracted position at 2510.

In some examples, the door is secured automatically when the door returns to the fully retracted position. In other examples, the door is secured by activating a locking device to hold the door in the retracted position. In other examples, an internal locking device clicks into place to hold the sliding door in place when the door is fully retracted. In still other examples, the door is secured by moving the door toward the retracted position without engaging any locks or other securing device. In this example, the door remains in the partially retracted or fully retracted position via inertia.

Figure 26:
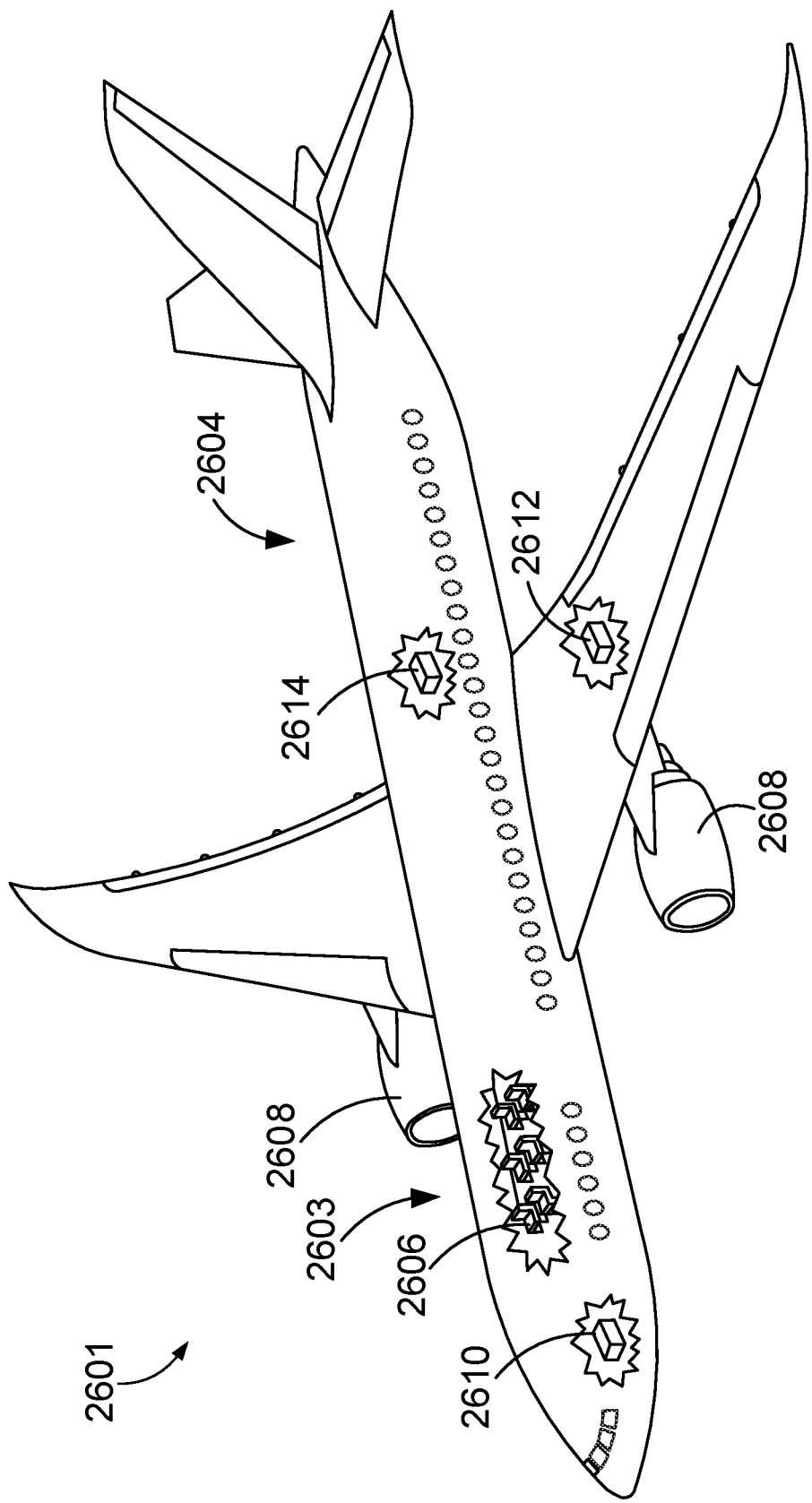
FIG. 26 is a schematic perspective view of a particular flying module.

With reference now to FIG. 26, a more specific diagram of the flying apparatus 2601 is depicted in which an implementation of the disclosure is advantageously employed. In this example, the flying apparatus 2601 includes an airframe 2603 with a plurality of systems 2604 and an interior 2606. In some examples, the flying apparatus 2601 is a vehicle, such as, but not limited to, the vehicle 108 in FIG. 1.

Implementations of the plurality of systems 2604 include one or more of a propulsion system 2408, an electrical system 2610, a hydraulic system 2612, and an environmental system 2614. The system may be implemented in the aircraft cabin within the aircraft. Other systems, not shown, are also candidates for inclusion. Although an aerospace example is shown, different advantageous implementations are applied to other industries, such as the automotive industry, etc.

Additional Examples

In some examples, a door assembly and seat unit are provided within a vehicle cabin, in particular an aircraft cabin. The door assembly includes at least a base structure, a door support member, a sliding door movably mounted on the door support member which is movable between a fully retracted position and at least one deployed position. In some examples, the sliding door is mounted above the base member such that the door member does not contact the floor of the cabin. A door adjustment device is provided between the door support member and the sliding door to movably support the sliding door on the door support member and permit lateral movement of the door along a slide support unit, such as rails or rails. The door adjustment device includes at least a carrier bracket fixed to the door support member or the sliding door, a slide unit which is coupled to the slide carrier unit fastened to the carrier bracket in a normal operation mode. The door adjustment device also includes a locking device which couples the carrier unit to the slide unit. The locking device is configured to release the slide unit from the carrier unit upon actuation of the locking device.

In other examples, a decoupling device allows for manual decoupling of a slide unit off a carrier unit bracket in event of a jam or damage to a door preventing it from sliding correctly along the rail(s). The door itself has a guide element at the top and/or the bottom. It is a guiding element(s) that keeps the door on a rail and prevents the door from falling over into the cabin/walkway when the door carrier unit is decoupled from the rail(s).

In an exemplary scenario, if a slide unit has a malfunction, breaks, or becomes jammed, the slide unit is manually separable from the carrier unit via the locking device such that the sliding door can still be moved from a deployed position or a partially deployed position in which a sliding door is closed and obstructing passenger access and path of egress from the vehicle into the retracted position in which passenger access is unobstructed.

In other examples, the carrier unit is fixed to the sliding door and moves with the sliding door when the slide unit is released from the carrier unit if the slide unit malfunctions and stops moving (stays in its malfunctioned position). It is also understood that upon actuation of the locking device, the carrier unit is freed or relieved from an engagement with the slide unit. This enables the door to be returned to the retracted position despite the slide unit being frozen in place (immobilized).

For example, in the normal operation mode the slide unit is in a locked state relative to the carrier bracket. In a non-operational state (jammed state) of the slide unit, the sliding door is blocked in a current, deployed or partially deployed position such that the slide unit is not further movable from the malfunction position to the fully retracted position. This can occur if the slide unit is deformed due to damage, force impact, accidental false force exerted on the sliding door or other incident causing the slide unit to become immobilized (stuck) in a slide support unit of the slide door device. In such cases, the door mounted to the immobilized slide unit is in an immovable state blocking access to walkways and points of egress. Thereby, when the slide unit is partially or fully jammed, the sliding door cannot be moved from an extended (deployed) position back to the fully retracted position such that a passenger access is obstructed.

In some examples, a backup latch is provided. If a user is unable to reach the primary decoupling latch, the backup latch is engaged to decouple the door from the slide units.

In still other examples, the door support member includes at least one guide element configured to movably support the sliding door on the door support member. The sliding door includes at least one guide profile corresponding with the guide element.

In an alternative or additional embodiment, the door support member includes at least one guide profile configured to movably support the sliding door on the door support member. The sliding door includes at least one guide element corresponding with the guide profile. The function of the guide element and the guide profile is to hold the sliding door on the door support member in a slidable manner during a malfunction of the slide unit(s) without the sliding door being a hazard to passengers of the cabin. The guide element and the guide profile may be seen as an additional auxiliary slide device configured to function as an additional slide mechanism which supports the sliding door further on the door support member. For example, in the normal operation mode, the sliding door is movably fixed to the door support member via the door adjustment device and/or the auxiliary slide device.

In another example, a door assembly for a seat unit provided within a vehicle cabin, in particular an aircraft cabin includes a door support member, a sliding door movable mounted on the door support member which is movable between a fully retracted position and at least one deployed position, and a door adjustment device disposed between the door support member and the sliding door to movably support the sliding door. The door adjustment device includes a carrier bracket, a slide unit releasable coupled to the carrier bracket, and a locking device which couples the slide unit to the carrier bracket in a normal operation mode. The locking device is configured to release the slide unit from the carrier bracket upon actuation of the locking device.

In other examples, the locking device is mounted to the carrier bracket. The locking device is arranged at least partly movable on the carrier bracket. The locking element, in another example, is configured as a locking plate.

In still other examples, the locking device includes at least one movable locking element and at least one movable operating element which is coupled to the locking element. The normal operation mode the locking device is located in a first position in which the locking element latches the slide unit to the carrier bracket. Upon actuation of the locking device, the locking element is moved from a first position to a second position in which the locking element releases the slide unit from the carrier bracket.

In still other examples, the decoupling latch is a switch, lever, button, toggle, handle, or other control device that is actuated to de-couple the slide unit from the side carrier bracket. In case of de-coupling of the slide unit from the carrier bracket, the sliding door is movable supported on the door support member via at least one auxiliary slide device.

In still other examples, the slide unit is coupled to the carrier bracket via a detachable joint mechanism comprising a detachable detent element and a corresponding detent receiving element detachably retaining the detent element.

The door support member in other examples include at least one guide element configured to movable support the sliding door on the door support member and the sliding door comprises at least one guide profile corresponding with the guide element. In another example, the door support member includes at least one guide profile configured to movable support the sliding door on the door support member and the sliding door comprises at least one guide element corresponding with the guide profile. The guide profile comprises at least one integrated end stop which comes into engagement with the guide element in an end position of the sliding door relative to the door support member.

In still other examples, the door adjustment device comprises a slide support unit which is fixed to the door support member and comprising at least one rail on which the slide unit is slidable guided in the normal operation mode.

In other examples where minor damage of the door adjustment device occurs, the slide unit is re-attached to the carrier bracket in maintenance. Further, the sliding door can be easily removed from the door support member, such as for maintenance activity.

The following paragraphs describe further aspects of the disclosure. In some implementations, the paragraphs described below can be further combined in any sub-combination without departing from the scope of the present disclosure.

1A. A door assembly including a sliding door carrier unit having a disengagement mechanism for utilization within a vehicle cabin comprising:
    a door support member;
    a sliding door movably mounted to the door support member which is movable between a fully retracted position and at least one deployed position; and
    a door adjustment device provided between the door support member and the sliding door to movably support the sliding door on the door support member, wherein the door adjustment device comprises:
    a carrier unit mounted to the sliding door;

a slide unit releasably coupled to the carrier unit in a normal operation mode; and a locking device that couples the slide unit to the carrier unit in the normal operation mode, wherein the locking device releases the slide unit from the carrier unit upon actuation of the locking device in a backup operation mode in which the carrier unit is detached from the slide unit in response to actuation of a decoupling latch.

2A. The door assembly of claim 1, further comprising:
a set of guides mounted on the sliding door that insert within a set of guide channels associated with the door support member to secure the sliding door in an upright configuration while moving the sliding door from the at least one deployed position back into the fully retracted position in the backup operation mode.

3A. The door assembly of claim 2, further comprising:
an upper guide on the sliding door sitting within with an upper guide channel of the door support member; and
a lower guide on the sliding door sitting within a lower guide channel of the door support member, wherein the set of guides prevent the sliding door from falling into an aisle of the vehicle cabin when the carrier unit is decoupled from the slide unit.

4A. The door assembly of claim 1, further comprising:
a guide mounted on the sliding door, the guide comprising a protruding end and a tab which is sized to fit within a channel in the set of guide channels on the door support member, wherein the guide supports the weight of the sliding door when the carrier unit is decoupled from the slide unit.

5A. The door assembly of claim 1, further comprising:
a decoupling latch associated with the sliding door, wherein actuation of the decoupling latch disengages the locking device to decouple the carrier unit from the slide unit and place the sliding door in a backup operation mode.

6A. The door assembly of claim 5, wherein the decoupling latch is associated with an interior surface of the sliding door accessible to a user utilizing the seat unit, and further comprising:
a secondary decoupling latch disposed along an exterior surface of the sliding door facing an aisle of the vehicle cabin, wherein the secondary decoupling latch disengages the locking device to decouple the carrier unit from the slide unit and place the sliding door in a backup operation mode.

7A. The door assembly of claim 6, further comprising:
a detachable joint mechanism coupling the slide unit to the carrier unit, the detachable joint mechanism comprising a detachable detent element associated with the door support member and a corresponding detent receiving element associated with the carrier unit detachably retaining the detent element.

8A. A method for disengaging a sliding door carrier unit of a seat unit associated with a vehicle cabin, the method comprising:
actuating a decoupling latch associated with a sliding door movably mounted to a door support member of the seat unit in a normal operation mode to disengage a locking device and detach a carrier unit of the sliding door from a slide unit of the door support member in response to an inability to move the sliding door along a set of rails in the normal operation mode, the sliding door is movable along the set of rails between a fully retracted position and at least one deployed position in the normal operation mode;

moving the sliding door in the at least one deployed position back toward the door support member in response in a backup operation mode in which the carrier unit is fully detached from the slide unit in response to actuation of the decoupling latch, wherein a set of guides associated with the sliding door are disposed within a set of guide channels associated with the door support member to secure the sliding door in an upright configuration while in the backup operation mode; and securing the sliding door in the fully retracted position in the backup operation mode to enable user access from the seat unit to an aisle of the vehicle cabin.

9A. The method of claim 8, wherein the decoupling latch is associated with an interior surface of the sliding door accessible to a user utilizing the seat unit, and further comprising:
actuating a secondary decoupling latch associated with an exterior surface of the sliding door facing an aisle of the vehicle cabin, wherein the secondary decoupling latch disengages the locking device to decouple the carrier unit from the slide unit and place the sliding door in a backup operation mode.

10A. A system for a seat unit sliding door carrier unit having a disengagement mechanism for utilization within a vehicle cabin, the system comprising:
a sliding door movably mounted to a door support member of the seat unit, the sliding door is movable between a fully retracted position and at least one deployed position, the sliding door comprising:
a carrier unit releasably coupled to a slide unit mounted on the door support member;
a locking device detachably couples the carrier unit to the slide unit in a normal operation mode, wherein the locking device is configured to release the slide unit from the carrier unit upon actuation of the locking device in a backup operation mode; and
a set of guides associated with the sliding door sit within a set of guide channels associated with the door support member to secure the sliding door in an upright configuration while in the backup operation mode.

11A. The system of claim 10, wherein the set of guides further comprises:
an upper guide on the sliding door sitting within with an upper guide channel of the door support member; and
a lower guide on the sliding door sitting within a lower guide channel of the door support member, wherein the set of guides prevent the sliding door from falling into an aisle of the vehicle cabin when the carrier unit is decoupled from the slide unit.

12A. The system of claim 10, wherein the set of guides further comprises:
a guide associated with the sliding door, the guide comprising a protruding end and a tab which is sized to fit within a channel in the set of guide channels on the door support member, wherein the guide supports the weight of the sliding door when the carrier unit is decoupled from the slide unit.

13A. The system of claim 12, further comprising:
at least one integrated end stop of a guide profile associated with the channel in the set of guide channels, wherein the guide comes into engagement with the at least one integrated end stop in an end position of the sliding door relative to the door support member.

14A. The system of claim 10, further comprising:
a decoupling latch associated with the sliding door, wherein the decoupling latch disengages the locking device to decouple the carrier unit from the slide unit and place the sliding door in a backup operation mode.

15A. The system of claim 14, wherein the decoupling latch is associated with an interior surface of the sliding door accessible to a user utilizing the seat unit, and further comprising:
a secondary decoupling latch associated with an exterior surface of the sliding door facing an aisle of the vehicle cabin, wherein the secondary decoupling latch disengages the locking device to decouple the carrier unit from the slide unit and place the sliding door in a backup operation mode.

16A. The system of claim 10, further comprising:
a detachable joint mechanism coupling the slide unit to the carrier unit, the detachable joint mechanism comprising a detachable detent element associated with the door support member and a corresponding detent receiving element associated with the carrier unit detachably retaining the detent element.

17A. The system of claim 16, further comprising:
at least one pin of the locking device fitting within at least one indentation of the detachable detent element locking the slide unit to the carrier unit, wherein actuation of the decoupling latch releases the at least one pin from the at least one indentation to permit decoupling of the slide unit from the carrier unit.

18A. The system of claim 10, further comprising:
a first position of the locking element in which the locking element latches the slide unit to the carrier unit while in normal operation mode; and
a second position of the locking element, wherein actuation of the locking device moves the locking element from the first position to the second position in which the locking element releases the slide unit from a carrier bracket associated with the carrier unit.

19A. The system of claim 10, further comprising:
a slide support unit fixed to the door support member comprising at least one rail on which the slide unit is slidably guided in normal operation mode.

20A. The system of claim 10, further comprising:
a carrier bracket mounted to an interior surface of the sliding door, the carrier unit mounted to the carrier bracket.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A door assembly comprising:
   a door support member of a seat unit;
   a sliding door which is movable between a fully retracted position and at least one deployed position; and
   a door adjustment device disposed between the door support member and the sliding door to movably support the sliding door on the door support member, wherein the door adjustment device comprises:
   a carrier unit mounted to the sliding door;
   a slide unit releasably coupled to the carrier unit in a normal operation mode; and
   a locking device that releasably couples the slide unit to the carrier unit in the normal operation mode, the locking device including a detent element associated with the slide unit and a corresponding receiving element associated with the carrier unit detachably retaining the detent element in the normal operation mode, the locking device including a locking element movable to release the detent element from the corresponding receiving element and coupled to a decoupling latch pivotally mounted to the carrier unit;
   wherein the slide unit is releasable from the carrier unit by the locking device in response to a manual actuation of the decoupling latch in a backup operation mode.

2. The door assembly of claim 1, further comprising:
   a set of guides associated with the sliding door disposed within a set of guide channels associated with the door support member to secure the sliding door in an upright configuration while moving the sliding door from the at least one deployed position back into the fully retracted position in the backup operation mode.

3. The door assembly of claim 2, the set of guides further comprising:
   an upper guide on the sliding door disposed within with an upper guide channel of the door support member; and
   a lower guide on the sliding door disposed within a lower guide channel of the door support member, wherein the set of guides maintain the sliding door in a substantially upright position relative to an aisle of a vehicle cabin when the slide unit is released from the carrier unit upon activation of the decoupling latch.

4. The door assembly of claim 1, further comprising:
   a guide associated with the sliding door, the guide comprising a protruding end and a tab which is sized to fit within a channel in a set of guide channels on the door support member, wherein the guide supports at least a portion of a weight of the sliding door when the carrier unit is decoupled from the slide unit.

5. The door assembly of claim 1, wherein the decoupling latch is a first decoupling latch disposed along an interior surface of the sliding door accessible to a user utilizing the seat unit, and further comprising:
   a second decoupling latch disposed along an exterior surface of the sliding door facing an aisle of a vehicle cabin, wherein the second decoupling latch disengages the locking device to decouple the carrier unit from the slide unit and place the sliding door in a backup operation mode.

6. The door assembly of claim 1, further comprising: wherein the locking element includes at least one pin of the locking device fitting within at least one indentation of the detent element of the slide unit to lock the detent element into the corresponding receiving element, wherein actuation of the decoupling latch moves the locking element to release the at least one pin from the at least one indentation to release the detent element from the corresponding receiving element decoupling of the slide unit from the carrier unit.

7. The door assembly of claim 1, further comprising:
   a first position of the locking element of the locking device, wherein the locking element latches the slide unit to the carrier unit while in normal operation mode; and
   a second position of the locking element, wherein actuation of the decoupling latch moves the locking element from the first position to the second position in which the locking device releases the slide unit from the carrier unit.

8. The door assembly of claim 1, further comprising:
   a carrier bracket mounted to an interior surface of the sliding door, the carrier unit mounted to the carrier bracket.

9. The door assembly of claim 1, further comprising:
   a spring-loaded operating element connected to the decoupling latch, the operating element activated by the actuation of the decoupling latch to move the locking element from an engagement position to a release position.

10. A method for disengaging a sliding door of a door assembly, the method comprising providing a first decoupling latch and a second decoupling latch;
   actuating the first decoupling latch or the second decoupling latch, the first decoupling latch associated with the sliding door movably mounted to a door support member of a seat unit in a normal operation mode to disengage a locking device and detach a carrier unit of the sliding door from a slide unit of the door support member in response to an inability to move the sliding door along a set of rails in the normal operation mode, the second decoupling latch associated with an exterior surface of the sliding door facing an aisle of a vehicle cabin, wherein the second decoupling latch disengages the locking device to decouple the carrier unit from the slide unit, the sliding door is movable along the set of rails between a fully retracted position and at least one deployed position in the normal operation mode;
   moving the sliding door from the at least one deployed position toward the door support member in a backup operation mode in which the carrier unit is fully detached from the slide unit, the normal operation mode switches to the backup operation mode in response to actuation of the first decoupling latch or the second decoupling latch, wherein a set of guides associated with the sliding door are disposed within a set of guide channels associated with the door support member to secure the sliding door in an upright configuration while in the backup operation mode; and securing the sliding door in the fully retracted position in the backup operation mode to enable user access from an inside area of the seat unit to the aisle of the vehicle cabin.

11. A system for disengaging a sliding door of a door assembly, the system comprising:
   the sliding door movably mounted to a door support member of a seat unit, the sliding door is movable between a fully retracted position and at least one deployed position, the sliding door comprising:
   a carrier unit releasably coupled to a slide unit mounted on the door support member;
   a locking device releasably couples the carrier unit to the slide unit in a normal operation mode, wherein the locking device is configured to release the slide unit from the carrier unit in response to actuation of a first decoupling latch in a backup operation mode, the first decoupling latch disposed along an interior surface of the sliding door accessible to a user utilizing the seat unit;
   a second decoupling latch disposed along an exterior surface of the sliding door facing an aisle of a vehicle cabin, wherein the second decoupling latch disengages the locking device to decouple the carrier unit from the slide unit and place the sliding door in the backup operation mode; and
   a set of guides of the sliding door disposed within a set of guide channels on the door support member to secure the sliding door in an upright configuration while in the backup operation mode.

12. The system of claim 11, wherein the set of guides further comprises:
   an upper guide on the sliding door disposed within with an upper guide channel of the door support member; and
   a lower guide on the sliding door disposed within a lower guide channel of the door support member, wherein the set of guides maintain the sliding door in a substantially upright position relative to the aisle of the vehicle cabin when the slide unit is released from the carrier unit upon activation of the first decoupling latch or the second decoupling latch.

13. The system of claim 11, wherein the set of guides further comprises:
   a guide associated with the sliding door, the guide comprising a protruding end and a tab which is sized to fit within a channel in the set of guide channels on the door support member, wherein the guide supports at least a portion of a weight of the sliding door when the carrier unit is decoupled from the slide unit.

14. The system of claim 11, further comprising:
   at least one integrated end stop of a guide profile associated with a channel in the set of guide channels, wherein a guide associated with the sliding door comes into engagement with the at least one integrated end stop in an end position of the sliding door relative to the door support member.

15. The system of claim 11, further comprising:
   a detent element associated with the slide unit and a corresponding receiving element associated with the carrier unit detachably retaining the detent element in a normal operation mode.

16. The system of claim 15, further comprising:
   at least one pin of the locking device fitting within at least one indentation of the detent element of the slide unit to lock the detent element into the corresponding receiving element, wherein actuation of the first decoupling latch releases the at least one pin from the at least one indentation to release the detent element from the corresponding receiving element decoupling of the slide unit from the carrier unit.

17. The system of claim 11, further comprising:
   a first position of a locking element of the locking device, wherein the locking element latches the slide unit to the carrier unit while in normal operation mode; and
   a second position of the locking element, wherein actuation of the first decoupling latch moves the locking element from the first position to the second position in which the locking device releases the slide unit from the carrier unit.

18. The system of claim 11, further comprising:
   at least one rail of the slide unit, wherein the carrier unit is slidably guided in the normal operation mode.

19. The system of claim 18, further comprising:
   at least one non-operational rail, wherein the carrier unit is disengaged from the nonoperational rail in the backup operation mode.

20. The system of claim 11, further comprising:
   a carrier bracket mounted to an interior surface of the sliding door, the carrier unit mounted to the carrier bracket.

* * * * *